(12) United States Patent
de Castro Alves et al.

(10) Patent No.: US 9,058,360 B2
(45) Date of Patent: Jun. 16, 2015

(54) EXTENSIBLE LANGUAGE FRAMEWORK USING DATA CARTRIDGES

(75) Inventors: Alexandre de Castro Alves, Santa Clara, CA (US); Anand Srinivasan, Bangalore (IN); Hoyong Park, San Jose, CA (US); Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 91 days.

(21) Appl. No.: 12/957,201

(22) Filed: Nov. 30, 2010

(65) Prior Publication Data

US 2011/0161356 A1 Jun. 30, 2011

Related U.S. Application Data

(60) Provisional application No. 61/327,903, filed on Apr. 26, 2010, provisional application No. 61/311,175, filed on Mar. 5, 2010, provisional application No. 61/290,460, filed on Dec. 28, 2009.

(51) Int. Cl.
G06F 17/30 (2006.01)
G06F 7/00 (2006.01)

(52) U.S. Cl.
CPC .... *G06F 17/30516* (2013.01); *G06F 17/30557* (2013.01)

(58) Field of Classification Search
USPC .......................................................... 707/702
See application file for complete search history.

(56) References Cited

U.S. PATENT DOCUMENTS

| 4,996,687 A | 2/1991 | Hess et al. |
| 5,051,947 A | 9/1991 | Messenger et al. |
| 5,495,600 A | 2/1996 | Terry et al. |
| 5,706,494 A | 1/1998 | Cochrane et al. |

(Continued)

FOREIGN PATENT DOCUMENTS

| EP | 1241589 A2 | 9/2002 |
| EP | 2474922 | 7/2012 |

(Continued)

OTHER PUBLICATIONS

Esper Reference Documentation, Copyright 2009, ver. 3.1.0, 293 pages.

(Continued)

*Primary Examiner* — Jeffrey A Burke
(74) *Attorney, Agent, or Firm* — Kilpatrick Townsend & Stockton LLP

(57) ABSTRACT

A framework for extending the capabilities of an event processing system using one or more plug-in components referred to herein as data cartridges. In one set of embodiments, the data cartridge framework described herein can enable an event processing system to support one or more extension languages that are distinct from the native event processing language supported by the system. For example, certain "extension language" data cartridges can be provided that enable an event processing system to support complex data types and associated methods/operations that are common in object-oriented languages, but are not common in event processing languages. In these embodiments, an event processing system can access an extension language data cartridge to compile and execute queries that are written using a combination of the system's native event processing language and the extension language.

16 Claims, 8 Drawing Sheets

(56) References Cited

U.S. PATENT DOCUMENTS

| | | | |
|---|---|---|---|
| 5,802,262 A | 9/1998 | Van De Vanter |
| 5,802,523 A | 9/1998 | Jasuja et al. |
| 5,822,750 A | 10/1998 | Jou et al. |
| 5,826,077 A | 10/1998 | Blakeley et al. |
| 5,850,544 A | 12/1998 | Parvathaneny et al. |
| 5,857,182 A | 1/1999 | DeMichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas |
| 6,006,235 A | 12/1999 | Macdonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,438,559 B1 * | 8/2002 | White et al. ............... 1/1 |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,985,904 B1 | 1/2006 | Kaluskar et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,533,087 B2 | 5/2009 | Liu et al. |
| 7,546,284 B1 | 6/2009 | Martinez et al. |
| 7,552,365 B1 | 6/2009 | Marsh et al. |
| 7,567,953 B2 | 7/2009 | Kadayam et al. |
| 7,580,946 B2 * | 8/2009 | Mansour et al. ............... 1/1 |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce |
| 7,634,501 B2 | 12/2009 | Yabloko |
| 7,636,703 B2 | 12/2009 | Taylor |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chkodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 * | 4/2010 | Stanley et al. ............. 707/999.1 |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,823,066 B1 * | 10/2010 | Kuramura ............... 715/717 |
| 7,827,146 B1 | 11/2010 | De Landstheer et al. |
| 7,827,190 B2 | 11/2010 | Pandya |
| 7,844,829 B2 | 11/2010 | Meenakshisundaram |
| 7,870,124 B2 | 1/2011 | Liu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | Maclennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,987,204 B2 | 7/2011 | Stokes |
| 7,988,817 B2 | 8/2011 | Son |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,073,826 B2 | 12/2011 | Srinivasan et al. |
| 8,099,400 B2 * | 1/2012 | Haub et al. ............... 707/705 |
| 8,103,655 B2 | 1/2012 | Srinivasan et al. |
| 8,122,006 B2 * | 2/2012 | De Castro Alves et al. .. 707/713 |
| 8,134,184 B2 * | 3/2012 | Becker et al. ............... 257/206 |
| 8,155,880 B2 | 4/2012 | Patel et al. |
| 8,195,648 B2 | 6/2012 | Zabback et al. |
| 8,204,873 B2 | 6/2012 | Chavan |
| 8,204,875 B2 | 6/2012 | Srinivasan et al. |
| 8,290,776 B2 | 10/2012 | Moriwaki et al. |
| 8,296,316 B2 | 10/2012 | Jain et al. |
| 8,315,990 B2 | 11/2012 | Barga et al. |
| 8,316,012 B2 | 11/2012 | Abouzied et al. |
| 8,346,511 B2 | 1/2013 | Schoning et al. |
| 8,392,402 B2 | 3/2013 | Mihaila et al. |
| 8,447,744 B2 | 5/2013 | De Castro Alves et al. |
| 8,458,175 B2 | 6/2013 | Stokes |
| 8,498,956 B2 | 7/2013 | Srinivasan et al. |
| 8,521,867 B2 | 8/2013 | Srinivasan et al. |
| 8,527,458 B2 | 9/2013 | Park et al. |
| 8,543,558 B2 | 9/2013 | Srinivasan et al. |
| 8,572,589 B2 | 10/2013 | Cataldo et al. |
| 8,589,436 B2 | 11/2013 | Srinivasan et al. |
| 8,676,841 B2 | 3/2014 | Srinivasan et al. |
| 8,713,049 B2 | 4/2014 | Jain et al. |
| 8,762,369 B2 | 6/2014 | Macho et al. |
| 8,775,412 B2 | 7/2014 | Day et al. |
| 2002/0023211 A1 | 2/2002 | Roth et al. |
| 2002/0032804 A1 | 3/2002 | Hunt |
| 2002/0038313 A1 | 3/2002 | Klein et al. |

(56) References Cited

U.S. PATENT DOCUMENTS

| | | |
|---|---|---|
| 2002/0049788 A1 | 4/2002 | Lipkin et al. |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0037048 A1 | 2/2003 | Kabra et al. |
| 2003/0046673 A1 | 3/2003 | Copeland et al. |
| 2003/0065655 A1 | 4/2003 | Syeda-Mahmood |
| 2003/0065659 A1 | 4/2003 | Agarwal et al. |
| 2003/0120682 A1 | 6/2003 | Bestgen et al. |
| 2003/0135304 A1* | 7/2003 | Sroub et al. .................. 701/1 |
| 2003/0200198 A1 | 10/2003 | Chandrasekar et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0204340 A1 | 9/2005 | Ruminer et al. |
| 2005/0229158 A1 | 10/2005 | Thusoo et al. |
| 2005/0273450 A1 | 12/2005 | McMillen et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0155719 A1 | 7/2006 | Mihaeli et al. |
| 2006/0167856 A1 | 7/2006 | Angele et al. |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington et al. |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1 | 3/2007 | von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156964 A1 | 7/2007 | Sistla |
| 2007/0192301 A1 | 8/2007 | Posner |
| 2007/0198479 A1 | 8/2007 | Cai et al. |
| 2007/0226188 A1 | 9/2007 | Johnson et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | McGoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0082484 A1 | 4/2008 | Averbuch et al. |
| 2008/0082514 A1 | 4/2008 | Khorlin et al. |
| 2008/0086321 A1* | 4/2008 | Walton .......................... 705/1 |
| 2008/0098359 A1 | 4/2008 | Ivanov et al. |
| 2008/0110397 A1 | 5/2008 | Son |
| 2008/0114787 A1 | 5/2008 | Kashiyama et al. |
| 2008/0120283 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0281782 A1 | 11/2008 | Agrawal |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2008/0313131 A1 | 12/2008 | Friedman et al. |
| 2009/0006320 A1 | 1/2009 | Ding et al. |
| 2009/0006346 A1 | 1/2009 | C N et al. |
| 2009/0007098 A1* | 1/2009 | Chevrette et al. .............. 717/177 |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0144696 A1 | 6/2009 | Andersen |
| 2009/0172014 A1 | 7/2009 | Huetter |
| 2009/0187584 A1 | 7/2009 | Johnson et al. |
| 2009/0216747 A1 | 8/2009 | Li et al. |
| 2009/0216860 A1 | 8/2009 | Li et al. |
| 2009/0228434 A1* | 9/2009 | Krishnamurthy et al. ........ 707/2 |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0293046 A1 | 11/2009 | Cheriton |
| 2009/0300093 A1 | 12/2009 | Griffiths et al. |
| 2009/0300181 A1* | 12/2009 | Marques ........................ 709/226 |
| 2009/0300580 A1 | 12/2009 | Heyhoe et al. |
| 2009/0300615 A1 | 12/2009 | Andrade et al. |

(56) References Cited

U.S. PATENT DOCUMENTS

| | | | |
|---|---|---|---|
| 2009/0313198 A1 | 12/2009 | Kudo et al. | |
| 2009/0327102 A1* | 12/2009 | Maniar et al. | 705/28 |
| 2010/0017379 A1 | 1/2010 | Naibo et al. | |
| 2010/0017380 A1* | 1/2010 | Naibo et al. | 707/4 |
| 2010/0023498 A1 | 1/2010 | Dettinger et al. | |
| 2010/0036831 A1 | 2/2010 | Vemuri | |
| 2010/0049710 A1 | 2/2010 | Young, Jr. et al. | |
| 2010/0057663 A1 | 3/2010 | Srinivasan et al. | |
| 2010/0057727 A1 | 3/2010 | Srinivasan et al. | |
| 2010/0057735 A1 | 3/2010 | Srinivasan et al. | |
| 2010/0057736 A1 | 3/2010 | Srinivasan et al. | |
| 2010/0057737 A1 | 3/2010 | Srinivasan et al. | |
| 2010/0094838 A1 | 4/2010 | Kozak | |
| 2010/0106946 A1 | 4/2010 | Imaki et al. | |
| 2010/0125584 A1 | 5/2010 | Navas | |
| 2010/0161589 A1 | 6/2010 | Nica et al. | |
| 2010/0223305 A1 | 9/2010 | Park et al. | |
| 2010/0223437 A1 | 9/2010 | Park et al. | |
| 2010/0223606 A1 | 9/2010 | Park et al. | |
| 2010/0312756 A1 | 12/2010 | Zhang et al. | |
| 2010/0318652 A1* | 12/2010 | Samba | 709/224 |
| 2011/0004621 A1 | 1/2011 | Kelley et al. | |
| 2011/0016160 A1 | 1/2011 | Zhang et al. | |
| 2011/0022618 A1 | 1/2011 | Thatte et al. | |
| 2011/0023055 A1 | 1/2011 | Thatte et al. | |
| 2011/0029484 A1 | 2/2011 | Park et al. | |
| 2011/0029485 A1 | 2/2011 | Park et al. | |
| 2011/0040746 A1 | 2/2011 | Handa et al. | |
| 2011/0055192 A1 | 3/2011 | Tang et al. | |
| 2011/0055197 A1 | 3/2011 | Chavan | |
| 2011/0093162 A1 | 4/2011 | Nielsen et al. | |
| 2011/0105857 A1 | 5/2011 | Zhang et al. | |
| 2011/0161321 A1 | 6/2011 | De Castro Alves et al. | |
| 2011/0161328 A1 | 6/2011 | Park et al. | |
| 2011/0161352 A1 | 6/2011 | De Castro Alves et al. | |
| 2011/0161397 A1 | 6/2011 | Bekiares et al. | |
| 2011/0173231 A1* | 7/2011 | Drissi et al. | 707/771 |
| 2011/0173235 A1* | 7/2011 | Aman et al. | 707/792 |
| 2011/0196891 A1 | 8/2011 | De Castro Alves et al. | |
| 2011/0270879 A1 | 11/2011 | Srinivasan et al. | |
| 2011/0302164 A1 | 12/2011 | Krishnamurthy et al. | |
| 2011/0314019 A1 | 12/2011 | Jimenez Peris et al. | |
| 2011/0321057 A1 | 12/2011 | Mejdrich et al. | |
| 2012/0041934 A1 | 2/2012 | Srinivasan et al. | |
| 2012/0130963 A1* | 5/2012 | Luo et al. | 707/693 |
| 2012/0166421 A1 | 6/2012 | Cammert et al. | |
| 2012/0166469 A1 | 6/2012 | Cammert et al. | |
| 2012/0191697 A1 | 7/2012 | Sherman et al. | |
| 2012/0233107 A1 | 9/2012 | Roesch et al. | |
| 2012/0259910 A1 | 10/2012 | Andrade et al. | |
| 2012/0278473 A1 | 11/2012 | Griffiths | |
| 2012/0290715 A1 | 11/2012 | Dinger et al. | |
| 2012/0324453 A1 | 12/2012 | Chandramouli et al. | |
| 2013/0046725 A1 | 2/2013 | Cammert et al. | |
| 2013/0117317 A1 | 5/2013 | Wolf | |
| 2013/0144866 A1 | 6/2013 | Jerzak et al. | |
| 2013/0191370 A1 | 7/2013 | Chen et al. | |
| 2013/0332240 A1 | 12/2013 | Patri et al. | |
| 2014/0095444 A1 | 4/2014 | Deshmukh et al. | |
| 2014/0095445 A1 | 4/2014 | Deshmukh et al. | |
| 2014/0095446 A1 | 4/2014 | Deshmukh et al. | |
| 2014/0095447 A1 | 4/2014 | Deshmukh et al. | |
| 2014/0095462 A1 | 4/2014 | Park et al. | |
| 2014/0095471 A1 | 4/2014 | Deshmukh et al. | |
| 2014/0095473 A1 | 4/2014 | Srinivasan et al. | |
| 2014/0095483 A1 | 4/2014 | Toillion et al. | |
| 2014/0095525 A1 | 4/2014 | Hsiao et al. | |
| 2014/0095529 A1 | 4/2014 | Deshmukh et al. | |
| 2014/0095533 A1 | 4/2014 | Shukla et al. | |
| 2014/0095535 A1 | 4/2014 | Deshmukh et al. | |
| 2014/0095537 A1 | 4/2014 | Park et al. | |
| 2014/0095540 A1 | 4/2014 | Hsiao et al. | |
| 2014/0095541 A1 | 4/2014 | Herwadkar et al. | |
| 2014/0095543 A1 | 4/2014 | Hsiao et al. | |
| 2014/0136514 A1 | 5/2014 | Jain et al. | |
| 2014/0156683 A1 | 6/2014 | De Castro Alves | |
| 2014/0172914 A1 | 6/2014 | Elnikety et al. | |
| 2014/0201225 A1 | 7/2014 | Deshmukh et al. | |
| 2014/0201355 A1 | 7/2014 | Bishnoi et al. | |
| 2014/0236983 A1 | 8/2014 | Alves et al. | |
| 2014/0237289 A1 | 8/2014 | De Castro Alves et al. | |
| 2014/0379712 A1 | 12/2014 | Alvarez | |

FOREIGN PATENT DOCUMENTS

| | | |
|---|---|---|
| WO | WO 00/49533 A2 | 8/2000 |
| WO | 0118712 | 3/2001 |
| WO | WO 01/59602 A2 | 8/2001 |
| WO | WO 01/65418 A2 | 9/2001 |
| WO | WO 03/030031 A2 | 4/2003 |
| WO | 2007122347 | 11/2007 |
| WO | 2012050582 | 4/2012 |

OTHER PUBLICATIONS

International Search Report dated Jul. 16, 2012 for PCT/US2012/034970.

Final Office Action for U.S. Appl. No. 12/548,290 dated Jul. 30, 2012.

Office Action for U.S. Appl. No. 13/193,377 dated Aug. 23, 2012.

Office Action for U.S. Appl. No. 11/977,437 dated Aug. 3, 2012.

Final Office Action for U.S. Appl. No. 11/601,415 dated Jul. 2, 2012.

Notice of Allowance for U.S. Appl. No. 12/506,891 dated Jul. 25, 2012.

Final Office Action for U.S. Appl. No. 12/506,905 dated Aug. 9, 2012.

Office Action for U.S. Appl. No. 12/548,187 (Jun. 20, 2012).

Notice of Allowance for U.S. Appl. No. 12/395,871 (May 4, 2012).

Office Action for U.S. Appl. No. 12/548,222 (Jun. 20, 2012).

Office Action for U.S. Appl. No. 12/534,398 (Jun. 5, 2012).

Office Action for U.S. Appl. No. 12/548,281 (Jun. 20, 2012).

Office Action for U.S. Appl. No. 12/913,636 (Jun. 7, 2012).

Notice of Allowance for U.S. Appl. No. 12/874,197 (Jun. 22 2012).

Abadi, et al., "Aurora: A Data Stream Management System," International Conference on Management of Data, Proceedings of the 2003 ACM SIGMOD International Conference on Management of Data, ACM Press, 2003, 4 pages.

Aho, et al., "Efficient String Matching: An Aid to Bibliographic Search," Communications of the ACM, Jun. 1975, vol. 18, No. 6, pp. 333-340, Copyright 1975, Association for Computing Machinery, Inc.

Arasu, "CQL: A language for Continuous Queries over Streams and Relations," Lecture Notes in Computer Science, 2004, vol. 2921/2004, pp. 1-19.

Arasu, et al., "The CQL Continuous Query Language: Semantic Foundations and Query Execution," Stanford University, The VLDB Journal—The International Journal on Very Large Data Bases, Jun. 2006, vol. 15, issue 2, pp. 1-32, Springer-Verlag New York, Inc.

Arasu, et al., "An Abstract Semantics and Concrete Language for Continuous Queries over Streams and Relations," 9th International Workshop on Database programming languages, Sep. 2003, 11 pages.

Arasu, et al., "STREAM: The Stanford Data Stream Management System," Department of Computer Science, Stanford University, 2004, p. 21.

Avnur, et al., "Eddies: Continuously Adaptive Query Processing," In Proceedings of the 2000 ACM SIGMOD International Conference on Data, Dallas TX, May 2000, 12 pages.

Avnur, et al., "Eddies: Continuously Adaptive Query Processing," slide show, believed to be prior to Oct. 17, 2007, 4 pages.

Babu, et al., "Continuous Queries over Data Streams," SIGMOD Record, Sep. 2001, vol. 30, No. 3, pp. 109-120.

Bai, et al., "A Data Stream Language and System Designed for Power and Extensibility," Conference on Information and Knowledge Management, Proceedings of the 15th ACM International Conference on Information and Knowledge Management, Arlington, Virginia, Nov. 5-11, 2006, 10 pages, Copyright 2006, ACM Press.

(56) References Cited

OTHER PUBLICATIONS

Bose, et al., "A Query Algebra for Fragmented XML Stream Data", 9th International Conference on Data Base Programming Languages (DBPL), Sep. 6-8, 2003, Potsdam, Germany, at URL: http://lambda,uta.edu/dbp103.pdf, 11 pages.
Buza, "Extension of CQL over Dynamic Databases," Journal of Universal Computer Science, 2006, vol. 12, No. 9, pp. 1165-1176.
Carpenter, "User Defined Functions," Oct. 12, 2000, at URL: http://www.sqlteam.com/itemprint.asp?ItemID=979, 4 pages.
Chan, et al., "Efficient Filtering of XML documents with Xpath expressions," VLDB Journal, 2002, pp. 354-379.
Chandrasekaran, et al., "TelegraphCQ: Continuous Dataflow Processing for an Uncertain World," Proceedings of CIDR 2003, 12 pages.
Chen, et al., "NiagaraCQ: A Scalable Continuous Query System for Internet Databases," Proceedings of the 2000 SIGMOD International Conference on Management of Data, May 2000, pp. 379-390.
Colyer, et al., "Spring Dynamic Modules Reference Guide," Copyright 2006-2008, ver. 1.0.3, 73 pages.
Colyer, et al., "Spring Dynamic Modules Reference Guide," Copyright 2006-2008, ver. 1.1.3, 96 pages.
"Complex Event Processing in the Real World," an Oracle White Paper, Sep. 2007, 13 pages.
Conway, "An Introduction to Data Stream Query Processing," Truviso, Inc., May 24, 2007, at URL: http://neilconway.org/talks/stream_intro.pdf, 71 pages.
"Coral8 Complex Event Processing Technology Overview," Coral8, Inc., Make it Continuous, pp. 1-8, Copyright 2007, Coral8, Inc.
"Creating WebLogic Domains Using the Configuration Wizard," BEA Products, Dec. 2007, ver. 10.0, 78 pages.
"Creating Weblogic Event Server Applications," BEA WebLogic Event Server, Jul. 2007, ver. 2.0, 90 pages.
Demers, et al., "Towards Expressive Publish/Subscribe Systems," Proceedings of the 10th International Conference on Extending Database Technology (EDBT 2006), Munich, Germany, Mar. 2006, pp. 1-18.
DeMichiel, et al., "JSR 220: Enterprise JavaBeans™, EJB 3.0 Simplified API," EJB 3.0 Expert Group, Sun Microsystems, May 2, 2006, ver. 3.0, 59 pages.
"Dependency Injection," Wikipedia, Dec. 30, 2008, printed on Apr. 29, 2011, at URL: http:en.wikipedia.org/w/index.php?title=Dependency_injection&oldid=260831402, pp. 1-7.
"Deploying Applications to WebLogic Server," BEA WebLogic Server, Mar. 30, 2007, ver. 10.0, 164 pages.
Deshpande, et al., "Adaptive Query Processing," slide show believed to be prior to Oct. 17, 2007, 27 pages.
"Developing Applications with Weblogic Server," BEA WebLogic Server, Mar. 30, 2007, ver. 10.0, 254 pages.
Diao, "Query Processing for Large-Scale XML Message Brokering," 2005, University of California Berkeley, 226 pages.
Diao, et al. "Query Processing for High-Volume XML Message Brokering", Proceedings of the 29th VLDB Conference, Berlin, Germany, 2003, 12 pages.
Dindar, et al., "Event Processing Support for Cross-Reality Environments," Pervasive Computing, IEEE CS, Jul.-Sep. 2009, pp. 2-9, Copyright 2009, IEEE.
"EPL Reference," BEA WebLogic Event Server, Jul. 2007, ver. 2.0, 82 pages.
Esper Reference Documentation, Copyright 2007, ver. 1.12.0, 158 pages.
Esper Reference Documentation, Copyright 2008, ver. 2.0.0, 202 pages.
"Fast Track Deployment and Administrator Guide for BEA WebLogic Server," BEA WebLogic Server 10.0 Documentation, printed on May 10, 2010, at URL: http://download.oracle.com/docs/cd/E13222_01/wls/docs100/quickstart/quick_start.html, 1 page.
Fernandez, et al., "Build your own XQuery processor", slide show, at URL: http://www.galaxquery.org/slides/edbt-summer-school2004.pdf, 2004, 2004, 116 pages.

Fernandez, et al., "Implementing XQuery 1.0: The Galax Experience," Proceedings of the 29th VLDB Conference, Berlin, Germany, 2003, 4 pages.
Florescu, et al., "The BEA/XQRL Streaming XQuery Processor," Proceedings of the 29th VLDB Conference, 2003, Berlin, Germany, 12 pages.
"Getting Started with WebLogic Event Server," BEA WebLogic Event Server, Jul. 2007, ver. 2.0, 66 pages.
Gilani, "Design and implementation of stream operators, query instantiator and stream buffer manager," Dec. 2003, 137 pages.
Golab, "Sliding Window Query Processing Over Data Streams," University of Waterloo, Waterloo, Ont. Canada, Aug. 2006, 182 pages.
Golab, et al., "Issues in Data Stream Management," ACM SIGMOD Record, vol. 32, issue 2, Jun. 2003, ACM Press, pp. 5-14.
Gosling, et al., "The Java Language Specification," Book, copyright 1996-2005, 3rd edition, 684 pages, Sun Microsystems USA. (due to size, reference will be uploaded in two parts).
Hopcroft, "Introduction to Automata Theory, Languages, and Computation," Second Edition, Addison-Wesley, Copyright 2001, 524 pages. (due to size, reference will be uploaded in two parts).
"Installing Weblogic Real Time," BEA WebLogic Real Time, Jul. 2007, ver. 2.0, 64 pages.
"Introduction to BEA WebLogic Server and BEA WebLogic Express," BEA WebLogic Server, Mar. 2007, ver. 10.0, 34 pages.
"Introduction to WebLogic Real Time," BEA WebLogic Real Time, Jul. 2007, ver. 2.0, 20 pages.
"Jboss Enterprise Application Platform 4.3 Getting Started Guide CP03, for Use with Jboss Enterprise Application Platform 4.3 Cumulative Patch 3," Jboss a division of Red Hat, Red Hat Documentation Group, Publication date Sep. 2007, Copyright 2008, 68 pages, Red Hat, Inc.
Jin, et al. "ARGUS: Efficient Scalable Continuous Query Optimization for Large-Volume Data Streams" 10th International Database Engineering and Applications Symposium (IDEAS'06), 2006, 7 pages.
Kawaguchi, "Java Architecture for XML Binding _ (JAXB) 2.0," Sun Microsystems, Inc., Apr. 19, 2006, 384 pages.
Knuth, et al., "Fast Pattern Matching in Strings," Siam J. Comput., vol. 6, No. 2, Jun. 1977, pp. 323-350.
Lakshmanan, et al., "On efficient matching of streaming XML documents and queries," 2002, 18 pages.
Lindholm, et al., "Java Virtual Machine Specification, 2nd Edition", Prentice Hall, Apr. 1999, 484 pages. (due to size, reference will be uploaded in two parts).
Liu, et al., "Efficient XSLT Processing in Relational Database System," Proceeding of the 32nd. International Conference on Very Large Data Bases (VLDB), Sep. 2006, 1106-1116, 11 pages.
Luckham, "What's the Difference Between ESP and CEP?" Complex Event Processing, downloaded Apr. 29, 2011, at URL: http://complexevents.com/?p=103, 5 pages.
Madden, et al., "Continuously Adaptive Continuous Queries (CACQ) over Streams," SIGMOD 2002, Jun. 4-6, 2002, 12 pages.
"Managing Server Startup and Shutdown," BEA WebLogic Server, Mar. 30, 2007, ver. 10.0, 134 pages.
"Matching Behavior," .NET Framework Developers Guide, Copyright 2008 Microsoft Corporation, downloaded Jul. 1, 2008 from URL: http://msdn.microsoft.com/en-us/library/0yzc2yb0(printer).aspx, pp. 1-2.
Motwani, et al., "Models and Issues in Data Streams," Proceedings of the 21st ACM SIGMOD-SIGACT-SIDART symposium on Principles f database systems, 2002, 30 pages.
Motwani, et al., "Query Processing Resource Management, and Approximation in a Data Stream Management System," Proceedings of CIDR 2003, Jan. 2003, 12 pages.
Munagala, et al., "Optimization of Continuous Queries with Shared Expensive Filters," Proceedings of the 26th ACM SIGMOD-SIGACT-SIGART symposium on Principles of database systems, believed to be prior to Oct. 17, 2007, p. 14.
"New Project Proposal for Row Pattern Recognition—Amendment to SQL with Application to Streaming Data Queries," H2-2008-027, H2 Teleconference Meeting, Jan. 9, 2008, pp. 1-6.

(56) References Cited

OTHER PUBLICATIONS

Novick, "Creating a User Defined Aggregate with SQL Server 2005," at URL: http://novicksoftware.com/Articles/sql-2005-product-user-defined-aggregate.html, 2005, 6 pages.
Oracle Database, SQL Language Reference, 11g Release 1 (11.1), B28286-02, Sep. 2007, 1496 pages, Oracle.
Oracle Application Server 10g, Release 2 and 3, New Features Overview, An Oracle White Paper, Oct. 2005, 48 pages, Oracle.
Oracle Application Server, Administrators Guide, 10g Release 3 (10.1.3.2.0), B32196-01, Jan. 2007, 376 pages, Oracle.
Oracle Application Server, Enterprise Deployment Guide, 10g Release 3 (10.1.3.2.0), B32125-02, Apr. 2007, 120 pages, Oracle.
Oracle Application Server, High Availability Guide, 10g Release 3 (10.1.3.2.0), B32201-01, Jan. 2007, 314 pages, Oracle.
"Oracle CEP Getting Started," Release 11gR1 (11.1.1) E14476-01, May 2009, 172 pages.
Oracle Database Data Cartridge Developer's Guide, B28425-03, 11g Release 1 (11.1), Oracle, Mar. 2008, 372 pages, Oracle.
Oracle Database, SQL Reference, 10g Release 1 (10.1), Part No. B10759-01, Dec. 2003, pp. 7-1 to 7-17; 7-287 to 7-290; 14-61 to 14-74. (due to size, reference will be uploaded in three parts).
"OSGI Service Platform Core Specification, The OSGI Alliance," Apr. 2007, ver. 4.1, release 4, 288 pages, OSGI Alliance.
Peng, et al., "Xpath Queries on Streaming Data," 2003, pp. 1-12, ACM Press.
Peterson, "Petri Net Theory and the Modeling of Systems", Prentice Hall, 1981, 301 pages.
PostgresSQL: Documentation: Manuals: PostgresSQL 8.2: Create Aggregate, believed to be prior to Apr. 21, 2007, 4 pages.
PostgresSQL: Documentation: Manuals: PostgresSQL 8.2: User-Defined Aggregates, believed to be prior to Apr. 21, 2007, 4 pages.
"Release Notes," BEA WebLogic Event Server, Jul. 2007, ver. 2.0, 8 pages.
Sadri, et al., "Expressing and Optimizing Sequence Queries in Database Systems," ACM Transactions on Database Systems, Jun. 2004, vol. 29, No. 2, pp. 282-318, ACM Press, Copyright 2004.
Sadtler, et al., "WebSphere Application Server Installation Problem Determination," Copyright 2007, pp. 1-48, IBM Corp.
Sharaf, et al., Efficient Scheduling of Heterogeneous Continuous Queries, VLDB '06, Sep. 12-15, 2006, pp. 511-522.
Spring Dynamic Modules for OSGi Service Platforms product documentation, SpringSource, Jan. 2008, 71 pages.
"Stanford Stream Data Manager," at URL: http://infolab.stanford.edu/stream/, last modified Jan. 5, 2006, pp. 1-9.
Stolze, "User-defined Aggregate Functions in DB2 Universal Database," at URL: http://www.128.ibm.com/developerworks/db2/library/tacharticle/0309stolze/0309stolze.html, Sep. 11, 2003, 11 pages.
Stream Query Repository: Online Auctions (CQL Queries), at URL: http://www-db.stanford.edu/strem/sqr/cql/onauc.html, Dec. 2, 2002, 4 pages.
Stream Query Repository: Online Auctions, at URL: http://www-db.stanford.edu/stream/sqr/onauc.html#queryspecsend, Dec. 2, 2002, 2 pages.
"Stream: The Stanford Stream Data Manager," IEEE Data Engineering Bulletin, Mar. 2003, pp. 1-8.
Streambase 5.1 product documentation, Streambase Systems, copyright 2004-2010, 878 pages.
Terry, et al., "Continuous queries over append-only database," Proceedings of 1992 ACM SIGMOD, pp. 321-330.
"Understanding Domain Configuration," BEA WebLogic Server, Mar. 30, 2007, ver. 10.0, 38 pages.
Vajjhala, et al, "The Java™ Architecture for XML Binding (JAXB) 2.0," Sun Microsystem, Inc., Final Release Apr. 19, 2006, 384 pages.
W3C, "XML Path Language (Xpath)," W3C Recommendation, Nov. 16, 1999, ver. 1.0, at URL: http://www.w3.org/TR/xpath, 37 pages.
"WebLogic Event Server Administration and Configuration Guide," BEA WebLogic Event Server, Jul. 2007, ver. 2.0, 108 pages.
"WebLogic Event Server Reference," BEA WebLogic Event Server, Jul. 2007, ver. 2.0, 52 pages.
"Weblogic Server Performance and Tuning," BEA WebLogic Server, Mar. 30, 2007, ver. 10.0, 180 pages.
"WebSphere Application Server V6.1 Problem Determination: IBM Redpaper Collection," WebSphere Software, IBM/Redbooks, Dec. 2007, 634 pages.
White, et al., "WebLogic Event Server: A Lightweight, Modular Application Server for Event Processing," 2nd International Conference on Distributed Event-Based Systems, Jul. 2-4, 2008, Rome, Italy, 8 pages, ACM Press, Copyright 2004.
Widom, et al., "CQL: A Language for Continuous Queries over Streams and Relations," believed to be prior to Oct. 17, 2007, 62 pages.
Widom, et al., "The Stanford Data Stream Management System," PowerPoint Presentation, believed to be prior to Oct. 17, 2007, 110 pages.
Zemke,"XML Query," Mar. 14, 2004, 29 pages.
De Castro Alves; et al, "Extensible Indexing Framework Using Data Cartridges," U.S. Appl. No. 12/913,636, filed on Oct. 27, 2010.
Park, et al., "Spatial Data Cartridge for Event Processing Systems," U.S. Appl. No. 12/949,081, filed Nov. 18, 2010.
De Castro Alves; et al, "Extensibility Platform Using Data Cartridges," U.S. Appl. No. 12/957,194, filed Nov. 30, 2010.
De Castro Alves; et al, "Class Loading Using Java Data Cartridges," U.S. Appl. No. 13/089,556, filed Apr. 19, 2011.
De Castro Alves; et al, "Extensible Language Framework Using Data Cartridges," U.S. Appl. No. 12/957,201, filed Nov. 30, 2010.
Non-Final Office Action for U.S. Appl. No. 12/396,008, mailed on Jun. 8, 2011, 10 pages.
Non-Final Office Action for U.S. Appl. No. 12/395,871, mailed on May 27, 2011, 7 pages.
Non-Final Office Action for U.S. Appl. No. 11/874,202, mailed on Dec. 3, 2009, 20 pages.
Final Office Action for U.S. Appl. No. 11/874,202, mailed on Jun. 8, 2010, 200 pages.
Notice of Allowance for U.S. Appl. No. 11/874,202, mailed on Dec. 22, 2010, 29 pages.
Notice of Allowance for U.S. Appl. No. 11/874,202, mailed on Mar. 31, 2011, 12 pages.
Notice of Allowance for U.S. Appl. No. 11/874,850, mailed on Nov. 24, 2009, 17 pages.
Supplemental Notice of Allowance for U.S. Appl. No. 11/874,850, mailed on Dec. 11, 2009, 5 pages.
Supplemental Notice of Allowance for U.S. Appl. No. 11/874,850, mailed on Jan. 27, 2010, 11 pages.
Non-Final Office Action for U.S. Appl. No. 11/874,896, mailed on Dec. 8, 2009, 19 pages.
Final Office Action for U.S. Appl. No. 11/874,896, mailed on Jul. 23, 2010, 28 pages.
Non-Final Office Action for U.S. Appl. No. 11/874,896, mailed on Nov. 22, 2010, 25 pages.
Non-Final Office Action for U.S. Appl. No. 11/977,439, mailed on Apr. 13, 2010, 7 pages.
Notice of Allowance for U.S. Appl. No. 11/977,439, mailed on Aug. 18, 2010, 11 pages.
Supplemental Notice of Allowance for U.S. Appl. No. 11/977,439, mailed on Sep. 28, 2010, 6 pages.
Notice of Allowance for U.S. Appl. No. 11/977,439, mailed on Nov. 24, 2010, 8 pages.
Notice of Allowance for U.S. Appl. No. 11/977,439, mailed on Mar. 16, 2011, 10 pages.
Non-Final Office Action for U.S. Appl. No. 11/977,437, mailed on Oct. 13, 2009, 9 pages.
Final Office Action for U.S. Appl. No. 11/977,437, mailed on Apr. 8, 2010, 18 pages.
Notice of Allowance for U.S. Appl. No. 11/977,440, mailed on Oct. 7, 2009, 6 pages.
Office Action for U.S. Appl. No. 11/874,197, mailed on Nov. 10, 2009, 14 pages.
Final Office Action for U.S. Appl. No. 11/874,197, mailed on Jun. 29, 2010, 17 pages.
Non-Final Office Action for U.S. Appl. No. 11/874,197, mailed on Dec. 22, 2010, 22 pages.

(56) References Cited

OTHER PUBLICATIONS

Non-Final Office Action for U.S. Appl. No. 11/873,407, mailed on Nov. 13, 2009, 7 pages.
Final Office Action for U.S. Appl. No. 11/873,407, mailed on Apr. 26, 2010, 11 pages.
Notice of Allowance for U.S. Appl. No. 11/873,407, mailed on Nov. 10, 2010, 14 pages.
Notice of Allowance for U.S. Appl. No. 11/873,407, mailed on Mar. 7, 2011, 8 pages.
Non-Final Office Action for U.S. Appl. No. 11/601,415, mailed on Sep. 17, 2008, 10 pages.
Final Office Action for U.S. Appl. No. 11/601,415, mailed on May 27, 2009, 26 pages.
Advisory Action for U.S. Appl. No. 11/601,415, mailed on Aug. 18, 2009, 3 pages.
Non-Final Office Action for U.S. Appl. No. 11/601,415, mailed on Nov. 30, 2009, 32 pages.
Final Office Action for U.S. Appl. No. 11/601,415, mailed on Jun. 30, 2010, 45 pages.
Non-Final Office Action for U.S. Appl. No. 11/927,681, mailed on Mar. 24, 2011, 17 pages.
Non-Final Office Action for U.S. Appl. No. 11/927,683, mailed on Mar. 24, 2011, 13 pages.
Non-Final Office Action for U.S. Appl. No. 10/948,523, mailed on Jan. 22, 2007, 31 pages.
Final Office Action for U.S. Appl. No. 10/948,523, mailed on Jul. 6, 2007, 37 pages.
Non-Final Office Action for U.S. Appl. No. 10/948,523, mailed Dec. 11, 2007, 47 pages.
Notice of Allowance for U.S. Appl. No. 10/948,523, mailed on Jul. 8, 2008, 30 pages.
Supplemental Notice of Allowance for U.S. Appl. No. 10/948,523, mailed on Jul. 17, 2008, 4 pages.
Notice of Allowance for U.S. Appl. No. 10/948,523, mailed on Dec. 1, 2010, 17 pages.
International Search Report dated Sep. 12, 2012 for PCT/US2012/036353.
Office Action for U.S. Appl. No. 13/396,464 dated Sep. 7, 2012.
Office Action for U.S. Appl. No. 13/244,272 dated Oct. 14, 2012.
Notice of Allowance for U.S. Appl. No. 12/548,209 dated Oct. 24, 2012.
Nah et al. "A Cluster-Based THO-Structured Scalable Approach for Location Information Systems," The Ninth IEEE International Workshop on Object-Oriented Real-Time Dependable Systems (WORDS' 03), pp. 225-233 (Jan. 1, 2003).
Hulton et al. "Mining Time-Changing Data Streams," Proceedings of the Seventh ACM SIGKDD, pp. 10 (Aug. 2001).
Stump et al. (ed.) Proceedings of IJCAR '06 Workshop "PLPV '06: Programming Languages meets Program Verification," pp. 1-113 (Aug. 21, 2006).
Vijayalakshmi et al. "Processing location dependent continuous queries in distributed mobile databases using mobile agents," IET-UK International Conference On Information and Communication Technology in Electrical Sciences (ICTES 2007), pp. 1023-1030 (Dec. 22, 2007).
Wang et al. "Distributed Continuous Range Query Processing on Moving Objects," Proceedings of the 17th international Conference on Database and Expert Systems Applications (DEXA'06), Berlin, DE, pp. 655-665 (Jan. 1, 2006).
Wu et al."Dynamic Data Management for Location Based Services in Mobile Environments," IEEE Proceedings of the Seventh International Database Engineering and Applications Symposium 2003 Piscataway. NJ. USA., pp. 172-181 (Jul. 16, 2003).
"StreamBase New and Noteworthy," StreamBase, dated Jan. 12, 2010, 878 pages.
Non-Final Office Action for U.S. Appl. No. 12/548,187, mailed on Sep. 27, 2011, 19 pages.
Final Office Action for U.S. Appl. No. 12/395,871, mailed on Oct. 19, 2011, 33 pages.
Non-Final Office Action for U.S. Appl. No. 12/548,222, mailed on Oct. 19, 2011, 27 pages.
Non-Final Office Action for U.S. Appl. No. 12/548,281, mailed on Oct. 3, 2011, 37 pages.
Non-Final Office Action for U.S. Appl. No. 12/548,290, mailed on Oct. 3, 2011, 34 pages.
Notice of Allowance for U.S. Appl. No. 11/874,896, mailed on Jun. 23, 2011, 30 pages.
Final Office Action for U.S. Appl. No. 11/874,197, mailed on Aug. 12, 2011, 26 pages.
Notice of Allowance for U.S. Appl. No. 11/927,681, mailed on Jul. 1, 2011, 8 pages.
Final Office Action for U.S. Appl. No. 11/927,683, mailed on Sep. 1, 2011, 18 pages.
Hao et al. "Achieving high performance web applications by service and database replications at edge servers," proceedings of IPCCC 2009, IEEE 28th International Performance Computing and Communications Conference, pp. 153-160 (Dec. 2009).
International Search Report dated for PCT/US2011/052019 (Nov. 17, 2011).
Office Action for U.S. Appl. No. 12/396,008 (Nov. 16, 2011).
Office Action for U.S. Appl. No. 12/506,891 (Dec. 14, 2011).
Office Action for U.S. Appl. No. 12/534,398 (Nov. 11, 2011).
Office Action for U.S. Appl. No. 11/601,415 (Dec. 9, 2011).
"Oracle Complex Event Processing CQL Language Reference," 11g Release 1 (11.1.1) E12048-01, Apr. 2010, 540 pages.
Martin et al "Finding application errors and security flaws using PQL: a program query language," Proceedings of the 20th annual ACM SIGPLAN conference on Object-oriented programming, systems, languages, and applications 40:1-19 (Oct. 2005).
Office Action for U.S. Appl. No. 12/534,384 (Feb. 28, 2012).
Office Action for U.S. Appl. No. 12/506,905 (Mar. 26, 2012).
Office Action for U.S. Appl. No. 12/548,209 (Apr. 16, 2012).
Notice of Allowance for U.S. Appl. No. 13/184,528 (Mar. 1, 2012).
Notice of Allowance for U.S. Appl. No. 11/977,437 dated Mar. 4, 2013. 9 pages.
Final Office Action for U.S. Appl. No. 13/244,272 dated Mar. 28, 2013, 29 pages.
Notice of Allowance for U.S. Appl. No. 12/957,194 dated Mar. 20, 2013. 9 pages.
Final Office Action for U.S. Appl. No. 12/396,464 dated Jan. 16, 2013, 16 pages.
Final Office Action for U.S. Appl. No. 12/913,636 dated Jan. 8, 2013, 20 pages.
Non-Final Office Action for U.S. Appl. No. 12/949,081 dated Jan. 9, 2013, 12 pages.
Final Office Action for U.S. Appl. No. 12/193,377 dated Jan. 17, 2013, 24 pages.
Final Office Action for U.S. Appl. No. 12/534,384 dated Feb. 12, 2013, 13 pages.
Final Office Action for U.S. Appl. No. 13/107,742 dated Feb. 14, 2013, 15 pages.
Non-Final Office Action for U.S. Appl. No. 13/102,665 dated Feb. 1, 2013, 11 pages.
Sansoterra "Empower SOL with Java User-Defined Functions," IT Jungle.com (Oct. 9, 2003).
Ullman et al., "Introduction to JDBC," Stanford University (2005).
Non-Final Office Action for U.S. Appl. No. 12/957,194 dated Dec. 7, 2012.
Non-Final Office Action for U.S. Appl. No. 13/089,556 dated Nov. 6, 2012.
Notice of Allowance for U.S. Appl. No. 12/534,398 dated Nov. 27, 2012.
Notice of Allowance for U.S. Appl. No. 12/506,905 dated Dec. 14, 2012.
U.S. Appl. No. 12/534,384, Notice of Allowance mailed on May 7, 2013, 12 pages.
U.S. Appl. No. 12/548,187, Non-Final Office Action mailed on Apr. 9, 2013, 17 Pages.
U.S. Appl. No. 12/548,222, Non-Final Office Action mailed on Apr. 10, 2013, 16 pages.
U.S. Appl. No. 12/548,281, Non-Final Office Action mailed on Apr. 12, 2013, 16 pages.

(56) References Cited

OTHER PUBLICATIONS

U.S. Appl. No. 12/548,290, Non-Final Office Action mailed on Apr. 15, 2013, 17 pages.
U.S. Appl. No. 13/089,556, Non-Final Office Action mailed on Apr. 10, 2013, 10 pages.
U.S. Appl. No. 12/548,281, Non-Final Office Action mailed on Feb. 13, 2014, 16 pages.
U.S. Appl. No. 13/177,748, Final Office Action mailed on Mar. 20, 2014, 23 pages.
International Search Report dated Apr. 3, 2014 for PCT/US2014/010832, 9 pages.
Cadonna et al. "Efficient event pattern matching with match windows," Proceedings of the 18th ACM SIGKDD international conference on Knowledge discovery and data mining, pp. 471-479 (Aug. 2012).
Nichols et al. "A faster closure algorithm for pattern matching in partial-order event data," IEEE International Conference on Parallel and Distributed Systems, pp. 1-9 (Dec. 2007).
U.S. Appl. No. 12/548,187, Final Office Action mailed on Jun. 10, 2013, 18 pages.
U.S. Appl. No. 12/548,222, Notice of Allowance mailed on Jul. 18, 2013, 12 pages.
U.S. Appl. No. 13/102,665, Final Office Action mailed on Jul. 9, 2013, 17 pages.
U.S. Appl. No. 13/107,742, Final Office Action mailed on Jul. 3, 2013, 19 pages.
Notice of Allowance for U.S. Appl. No. 11/977,437 dated Jul. 10, 2013, 10 pages.
SQL Tutorial-In, Tizag.com, http://web.archive.org/web/20090216215219/http://www.tizag.com/sgiTutorial/sqlin.php, Feb. 16, 2009, pp. 1-3.
Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.
What is BPM? , Datasheet [online]. IBM, [retrieved on Jan. 28, 2013]. Retrieved from the Internet: <URL: http://www-01.ibm.com/software/info/bpm/whatis-bpm/>.
U.S. Appl. No. 12/548,281, Final Office Action mailed on Oct. 10, 2013, 21 pages.
U.S. Appl. No. 12/548,290, Notice of Allowance mailed on Sep. 11, 2013, 6 pages.
U.S. Appl. No. 12/949,081, Final Office Action mailed on Aug. 27, 2013, 13 pages.
U.S. Appl. No. 13/089,556, Final Office Action mailed on Aug. 29, 2013, 10 pages.
U.S. Appl. No. 13/177,748, Non-Final Office Action mailed on Aug. 30, 2013, 24 pages.
U.S. Appl. No. 13/193,377, Notice of Allowance mailed on Aug. 30, 2013, 19 pages.
Oracle™ Fusion Middleware CQL Language Reference, 11g Release 1 (11.1.1.6.3) E12048-10, Aug. 2012, pp. 6-1 to 6-12.
Oracle™ Complex Event Processing CQL Language Reference, 11g Release 1 (11.1.1.4.0) E12048-04, Jan. 2011, pp. 6.1 to 6.12.
Oracle™ Complex Event Processing CQL Language Reference, 11g Release 1 (11.1.1) E12048-03, Apr. 2010, sections 18-4 to 18.4.2.
Pattern Recognition With MATCH_RECOGNIZE, Oracle™ Complex Event Processing CQL Language Reference, 11g Release 1 (11.1.1) E12048-01, May 2009, pp. 15.1 to 15.20.
Supply Chain Event Management: Real-Time Supply Chain Event Management, product information Manhattan Associates, 2009-2012.
U.S. Appl. No. 11/601,415, Non-Final Office mailed on Dec. 11, 2013, 58 pages.
U.S. Appl. No. 12/396,464, Non Final Office Action mailed on Dec. 31, 2013, 16 pages.
U.S. Appl. No. 13/089,556, Non-Final Office Action mailed on Jan. 9, 2014, 14 pages.
Non-Final Office Action for U.S. Appl. No. 12/548,187 dated Feb. 6, 2014, 53 pages.
Agrawal et al. "Efficient pattern matching over event streams," Proceedings of the 2008 ACM SIGMOD international conference on Management of data, pp. 147-160 (Jun. 2008).
Chandramouli et al., High-Performance Dynamic Pattern Matching over Disordered Streams, Proceedings of the VLDB Endowment, vol. 3 Issue 1-2, Sep. 2010, pp. 220-231.
Chapple "Combining Query Results with the UNION Command," ask.com Computing Databases, downloaded from: http://databases.about.com/od/sql/a/union.htm (no date, printed on Oct. 14, 2013).
Fantozzi, A Strategic Approach to Supply Chain Event Management, student submission for Masters Degree, Massachusetts Institute of Technology, Jun. 2003.
Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011.
Ogrodnek, Custom UDFs and hive, Bizo development blog http://dev.bizo.com, Jun. 23, 2009, 2 pages.
Pradhan, Implementing and Configuring SAP® Event Management, Galileo Press, 2010, pp. 17-21.
Wilson et al., SAP Event Management, an Overview, Q Data USA, Inc., 2009.
Babu et al., "Exploiting k-Constraints to Reduce Memory Overhead in Continuous Queries Over Data Streams", ACM Transactions on Database Systems (TODS) vol. 29 Issue 3, Sep. 2004.
Tho et al. "Zero-latency data warehousing for heterogeneous data sources and continuous data streams," 5th International Conference on Information Integrationand Web-based Applications Services (Sep. 2003) 12 pages.
"SQL Subqueries"—Dec. 3, 2011.
"Caching Data with SqiDataSource Control"—Jul. 4, 2011.
"SCD—Slowing Changing Dimensions in a Data Warehouse"—Aug. 7, 2011.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 14/077,230 dated Dec. 4, 2014, 30 pages.
Non-Final Office Action for U.S. Appl. No. 13/828,640 dated Dec. 2, 2014, 11 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/839,288 dated Dec. 4, 2014, 30 pages.
Bottom-up parsing, Wikipedia, downloaded from: http://en.wikipedia.org/wiki/Bottom-up_parsing, Sep. 8, 2014, pp. 1-2.
Branch Predication, Wikipedia, downloaded from: http://en.wikipedia.org/wiki/Branch_predication, Sep. 8, 2014, pp. 1-4.
Microsoft Computer Dictionary, 5th Edition, Microsoft Press, Redmond, WA, ©, 2002, pp. 238-239 and 529.
Notice of Allowance for U.S. Appl. No. 13/089,556 dated Oct. 6, 2014, 9 pages.
U.S. Appl. No. 12/396,464, Notice of Allowance mailed on Sep. 3, 2014, 7 pages.
U.S. Appl. No. 12/548,187, Advisory Action mailed on Sep. 26, 2014, 6 pages.
U.S. Appl. No. 12/548,281, Final Office Action mailed on Aug. 13, 2014, 19 pages.
U.S. Appl. No. 13/764,560, Non-Final Office Action mailed on Sep. 12, 2014, 23 pages.
U.S. Appl. No. 13/770,969, Non-Final Office Action mailed on Aug. 7, 2014, 9 pages.
U.S. Appl. No. 14/302,031, Non-Final Office Action mailed on Aug. 27, 2014, 19 pages.

(56) References Cited

OTHER PUBLICATIONS

Abadi et al., Aurora: a new model and architecture for data stream management, The VLDB Journal the International Journal on Very Large Data Bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, The VLDB Journal the International Journal on Very Large Data Bases, vol. 12, No. 2, Aug. 1, 2003, pp. 140-156.
Dewson, Beginning SQL Server 2008 for Developers: From Novice to Professional, A Press, Berkeley, CA, 2008, pp. 337-349 and 418-438.
Harish D et al., Identifying robust plans through plan diagram reduction, PVLDB '08, Auckland, New Zealand, Aug. 23-28, pp. 1124-1140.
Krämer, Continuous Queries Over Data Streams—Semantics and Implementation, Fachbereich Mathematik and Informatik der Philipps—Universitat, Marburg, Germany, Retrieved from the Internet: URL:http://archiv.ub.uni-marburg.de/dissjz007/0671/pdfjdjk.pdf, Jan. 1, 2007; 313 pages.
International Application No. PCT/US2013/062047, International Search Report and Written Opinion mailed on Jul. 16, 2014, 12 pages.
International Application No. PCT/US2013/062050, International Search Report & Written Opinion mailed on Jul. 2, 2014, 13 pages.
International Application No. PCT/US2013/062052, International Search Report & Written Opinion mailed on Jul. 3, 2014, 12 pages.
International Application No. PCT/US2013/073086, International Search Report and Written Opinion mailed on Mar. 14, 2014.
International Application No. PCT/US2014/017061, International Search Report and Written Opinion mailed on Sep. 9, 2014, 12 pages.
Rao et al., Compiled Query Execution Engine using JVM, ICDE '06, Atlanta, GA, Apr. 3-7, 2006, 12 pages.
Medhabi et al., Optimizing complex sequence pattern extraction using caching, data engineering workshops (ICDEW)~ 2011 IEEE 27th international conference on IEEE, Apr. 11, 2011, pp. 243-248.
Shah et al., Flux: an adaptive partitioning operator for continuous query systems, Proceedings of the 19th International Conference on Data Engineering, Mar. 5-8, 2003, pp. 25-36.
Stillger et al., LEO—DB2's Learning Optimizer, Proc. of the VLDB, Roma, Italy, Sep. 2001, pp. 19-28.
Call User Defined Functions from Pig, Amazon Elastic MapReduce, Mar. 2009, 2 pages.
Strings in C, retrieved from the internet: <URL: https://web.archive.org/web/20070612231205/http:l/web.cs.swarthmore.edu/-newhall/unixhelp/C_strings.html> [retrieved on May 13, 2014], Swarthmore College, Jun. 12, 2007, 3 pages.
Non-Final Office Action for U.S. Appl. No. 12/913,636 dated Jul. 24, 2014, 21 pages.
U.S. Appl. No. 11/874,197, Notice of Allowance mailed on Jun. 22, 2012, 20 pages.
U.S. Appl. No. 12/396,464, Final Office Action mailed on May 16, 2014, 16 pages.
U.S. Appl. No. 12/396,464, Non-Final Office Action mailed on Sep. 7, 2012, 18 pages.
U.S. Appl. No. 12/548,187, Final Office Action mailed on Jun. 4, 2014, 64 pages.
U.S. Appl. No. 13/089,556, Final Office Action mailed on Jun. 13, 2014, 14 pages.
U.S. Appl. No. 13/107,742, Non-Final Office Action mailed on Jun. 19, 2014, 20 pages.
U.S. Appl. No. 13/244,272, Notice of Allowance mailed on Aug. 12, 2013, 12 pages.
International Application No. PCT/US2011/052019, International Preliminary Report on Patentability mailed on Mar. 28, 2013, 6 pages.
International Application No. PCT/US2012/034970, International Preliminary Report on Patentability mailed on Nov. 21, 2013, 7 pages.
International Application No. PCT/US2012/036353, International Preliminary Report on Patentability mailed on Nov. 28, 2013, 6 pages.
Non-Final Office Action for U.S. Appl. No. 13/830,378 dated Feb. 25, 2015, 23 pages.
Non-Final Office Action for U.S. Appl. No. 13/830,129 dated Feb. 27, 2015, 19 pages.
International Application No. PCT/US2014/068641, International Search Report and Written Opinion mailed on Feb. 26, 2015, 11 pages.
Cranor et al. "Gigascope: a stream database for network applications," Proceedings of the 2003 ACM SIGMOD international conference on management of data, pp. 647-651(Jun. 2003).
International Application No. PCT/US2014/010832, Written Opinion mailed on Dec. 15, 2014, 5 pages.
International Application No. PCT/US2014/010920, International Search Report and Written Opinion mailed on Dec. 15, 2014, 10 pages.
International Application No. PCT/US2014/017061, Written Opinion mailed on Feb. 3, 2015, 6 pages.
U.S. Appl. No. 12/949,081, Non-Final Office Action mailed on Jan. 28, 2015, 20 pages.
U.S. Appl. No. 13/107,742, Final Office Action mailed on Jan. 21, 2015, 23 pages.
U.S. Appl. No. 13/177,748, Non-Final Office Action mailed on Feb. 3, 2015, 22 pages.
U.S. Appl. No. 13/770,961, Non-Final Office Action mailed on Feb. 4, 2015, 22 pages.
U.S. Appl. No. 13/770,969, Notice of Allowance mailed on Jan. 22, 2015, 5 pages.
U.S. Appl. No. 13/829,958, Non-Final Office Action mailed on Dec. 11, 2014, 15 pages.
U.S. Appl. No. 13/906,162, Non-Final Office Action mailed on Dec. 29, 2014, 10 pages.
Non-Final Office Action for U.S. Appl. No. 12/913,636 dated Apr. 1, 2015, 22 pages.
Final Office Action for U.S. Appl. No. 13/827,631 dated Apr. 3, 2015, 11 pages.
Notice of Allowance for U.S. Appl. No. 13/839,288 dated Apr. 3, 2015, 12 pages.
European Patent Application No. 12783063.6, Extended Search Report mailed Mar. 24, 2015, 6 pages.

\* cited by examiner

EXTENSIBLE LANGUAGE FRAMEWORK USING DATA CARTRIDGES

CROSS-REFERENCES TO RELATED APPLICATIONS

The present application claims the benefit and priority under 35 U.S.C. 119(e) of the following provisional applications, the entire contents of which are incorporated herein by reference for all purposes:

U.S. Provisional Application No. 61/290,460, filed Dec. 28, 2009, entitled EXTENSIBILITY PLATFORM USING DATA CARTRIDGES;

U.S. Provisional Application No. 61/311,175, filed Mar. 5, 2010, entitled EXTENSIBILITY PLATFORM USING DATA CARTRIDGES; and U.S. Provisional Application No. 61/327,903, filed Apr. 26, 2010, entitled EXTENSIBLE INDEXING FRAMEWORK USING DATA CARTRIDGES.

The present application is also related to the following commonly owned nonprovisional patent application, the entire contents of which are incorporated herein by reference for all purposes:

U.S. patent application Ser. No. 12/957,194, filed Nov. 30, 2010, entitled EXTENSIBILITY PLATFORM USING DATA CARTRIDGES.

BACKGROUND

Embodiments of the present invention relate in general to event processing, and in particular to techniques for extending the capabilities of an event processing system to support one or more extension languages.

Databases have traditionally been used in applications that require storage of data and querying capability on the stored data. Existing databases are thus best equipped to run queries over a finite stored data set. The traditional database model is however not well suited for a growing number of modern applications in which data is received as a stream of events instead of being stored as a bounded data set. A data stream, also referred to as an event stream, is characterized by a real-time, potentially continuous, sequence of events. A data or event stream thus represents a potentially unbounded stream of data. Examples of sources of events can include various sensors and probes (e.g., RFID sensors, temperature sensors, etc.) configured to send a sequence of sensor readings, financial tickers sending out pricing information, network monitoring and traffic management applications sending network status updates, events from click stream analysis tools, global positioning systems (GPSs) sending GPS data, and others.

Oracle Corporation™ provides a system (referred to as a Complex Event Processing, or CEP, system) for processing such event streams. A CEP system is quite different from a relational database management system (RDBMS) in which data is stored in a database and then processed using one or more queries. In a CEP system, a query is run continuously and query processing is performed in real-time as events in a stream are received by the system.

A CEP system can receive events from various different sources for various different applications. Accordingly, the data that is received may not follow a fixed format or schema but may be more heterogeneous in nature (e.g., binary data, XML data without an associated schema, etc.). For example, the data that is received may include streams of image data for an image processing application, streams of audio data for an audio processing application, streams of spatial or geographic or location data for a GPS application, streams of stock data for a financial application, and the like. As a result of the different data types and sources and their different data manipulation requirements, specialized functions or methods are usually needed to process the streaming data. While a CEP system can provide support for some native data types and/or methods/functions for the native data types, these native data types or functions are many times not sufficient to cover the diverse types of processing needed by applications that use a CEP system.

As a result, processing platforms such as CEP systems constantly have to be extended by application developers and service providers to support heterogeneous data formats and their data manipulation mechanisms in order to interact/interoperate with diverse sources of events and data. For example, consider a CEP system that processes localization events emitted by GPS devices. Such a CEP system would need to understand spatial data formats and functions related to the spatial data format.

In the past, the capabilities of a CEP system were extended exclusively through user defined functions (UDFs) or special code (e.g., customized Java beans). To achieve extensibility, an application developer for a specific application had to define customized user defined functions (UDFs) to interact with the specialized application. The application developer had to design one function at a time and define the function's interface based upon predefined data types provided by the CEP system.

However, this approach has several drawbacks and inefficiencies. The UDFs that are designed are application-scoped and thus are hard to re-use amongst other applications of the CEP system. The UDFs cannot be reused since they are closely coupled or tied to the application defining the UDF. For example, a UDF defined for a video-processing application cannot be used in another application. Further, the UDFs are individually defined and cannot be grouped into domains (e.g., spatial), therefore making their management difficult. Additionally, UDFs provide a poor programming experience, as the usage of the extension in the form of a UDF is not transparent to the user.

BRIEF SUMMARY

Embodiments of the present invention provide a framework for extending the capabilities of an event processing system using one or more plug-in components referred to herein as data cartridges. Generally speaking, a data cartridge is a self-contained unit of data that can be registered with an event processing system and can store information pertaining to one or more objects (referred to herein as extensible objects) that are not natively supported by the system. Examples of such extensible objects can include data types, functions, indexes, data sources, and others. By interacting with a data cartridge, an event processing system can compile and execute queries that reference extensible objects defined in the data cartridge, thereby extending the system beyond its native capabilities.

In one set of embodiments, the data cartridge framework described herein can enable an event processing system to support one or more extension languages that are distinct from the native event processing language supported by the system. For example, certain "extension language" data cartridges can be provided that enable an event processing system to support complex data types and associated methods/operations that are common in object-oriented languages (e.g., Java, C++, Scala, etc.), but are not common in event processing languages (e.g., Continuous Query Language (CQL)). Other types of extension language data cartridges for supporting other types of languages can also be provided. In these embodiments, an event processing system can access an extension language data cartridge to compile and execute queries that are written using a combination of the system's native event processing language and the extension language.

According to one embodiment of the present invention, a method is provided that comprises receiving, by a computer system, a query expressed in an event processing language, the query including a reference to a complex type implemented in another language distinct from the event processing language. The method further comprises compiling, by the computer system, the query, where the compiling includes retrieving metadata pertaining to the complex type from information stored in a data cartridge for the complex type, and generating, based on the metadata, executable instructions for executing the query.

In one embodiment, the event processing language is Continuous Query Language (CQL).

In one embodiment, the another language distinct from the event processing language is an object-oriented language.

In one embodiment, the another language distinct from the event processing language is Java, and the complex type is a Java class.

In one embodiment, the query is configured for processing one or more events received via one or more event streams.

In one embodiment, retrieving the metadata pertaining to the complex type comprises determining whether the complex type corresponds to an attribute in any of the one or more event streams. If the complex type does not correspond to an attribute in any of the event streams, the retrieving further comprises determining whether the complex type corresponds to a type defined in the event processing language. If the complex type does not correspond to a type defined in the event processing language, the metadata pertaining to the complex type is retrieved from the data cartridge.

In one embodiment, the reference to the complex type includes a invocation of a method associated with the complex type, and the invocation includes a name of the method and one or more parameters.

In one embodiment, the method associated with the complex type is a constructor for the complex type.

In one embodiment, compiling the query further comprises analyzing the metadata pertaining to the complex type to determine whether the metadata includes a method signature that matches the name of the method and the one or more parameters. If the metadata includes a method signature that matches the name of the method and the one or more parameters, compiling the query further comprises retrieving, from the data cartridge, a reference to a function corresponding to the method associated with the complex type, and the function's implementation being included in the information stored by the data cartridge for the complex type, and including the reference to the function in the executable instructions for executing the query.

In one embodiment, analyzing the metadata pertaining to the complex type comprises determining native data types for the one or more parameters, the native data types being native to the event processing system; mapping the native data types to corresponding data types in the another language distinct from the event processing language; and matching the corresponding data types to data types specified in the method signature.

In one embodiment, the method further comprises executing the query using the executable instructions to process events received via one or more event streams.

In one embodiment, executing the query comprises invoking the reference to the function and executing the implementation of the function included in the information stored by the data cartridge for the complex type.

According to another embodiment of the present invention, a system is provided that includes a processor. The processor is configured to receive a query expressed in an event processing language, the query including a reference to a complex type implemented in another language distinct from the event processing language, and to compile the query. In various embodiments, the compiling comprises retrieving metadata pertaining to the complex type from information stored in a data cartridge for the complex type, and generating, based on the metadata, executable instructions for executing the query.

According to another embodiment of the present invention, a non-transitory computer-readable storage medium is provided. The non-transitory computer-readable storage medium has stored thereon instructions executable by a processor, where the instructions comprise instructions that cause the processor to receive a query expressed in an event processing language, the query including a reference to a complex type implemented in another language distinct from the event processing language, and instructions that cause the processor to compile the query. In various embodiments, the compiling comprises retrieving metadata pertaining to the complex type from information stored in a data cartridge for the complex type, and generating, based on the metadata, executable instructions for executing the query.

The foregoing, together with other features and embodiments will become more apparent when referring to the following specification, claims, and accompanying drawings.

DETAILED DESCRIPTION

In the following description, for the purposes of explanation, specific details are set forth in order to provide a thorough understanding of embodiments of the invention. However, it will be apparent that certain embodiments can be practiced without these specific details.

Embodiments of the present invention provide a framework for extending the capabilities of an event processing system using one or more plug-in components referred to herein as data cartridges. Generally speaking, a data cartridge is a self-contained unit of data that can be registered with an event processing system and can store information pertaining to one or more objects (referred to herein as extensible objects) that are not natively supported by the system. Examples of such extensible objects can include data types, functions, indexes, data sources, and others. By interacting with a data cartridge, an event processing system can compile and execute queries that reference extensible objects defined in the data cartridge, thereby extending the system beyond its native capabilities.

In one set of embodiments, the data cartridge framework described herein can enable an event processing system to support one or more extension languages that are distinct from the native event processing language supported by the system. For example, certain "extension language" data cartridges can be provided that enable an event processing system to support complex data types and associated methods/operations that are common in object-oriented languages (e.g., Java, C++, Scala, etc.), but are not common in event processing languages (e.g., Continuous Query Language (CQL)). Other types of extension language data cartridges for supporting other types of languages can also be provided. In these embodiments, an event processing system can access an extension language data cartridge to compile and execute queries that are written using a combination of the system's native event processing language and the extension language.

Figure 1:
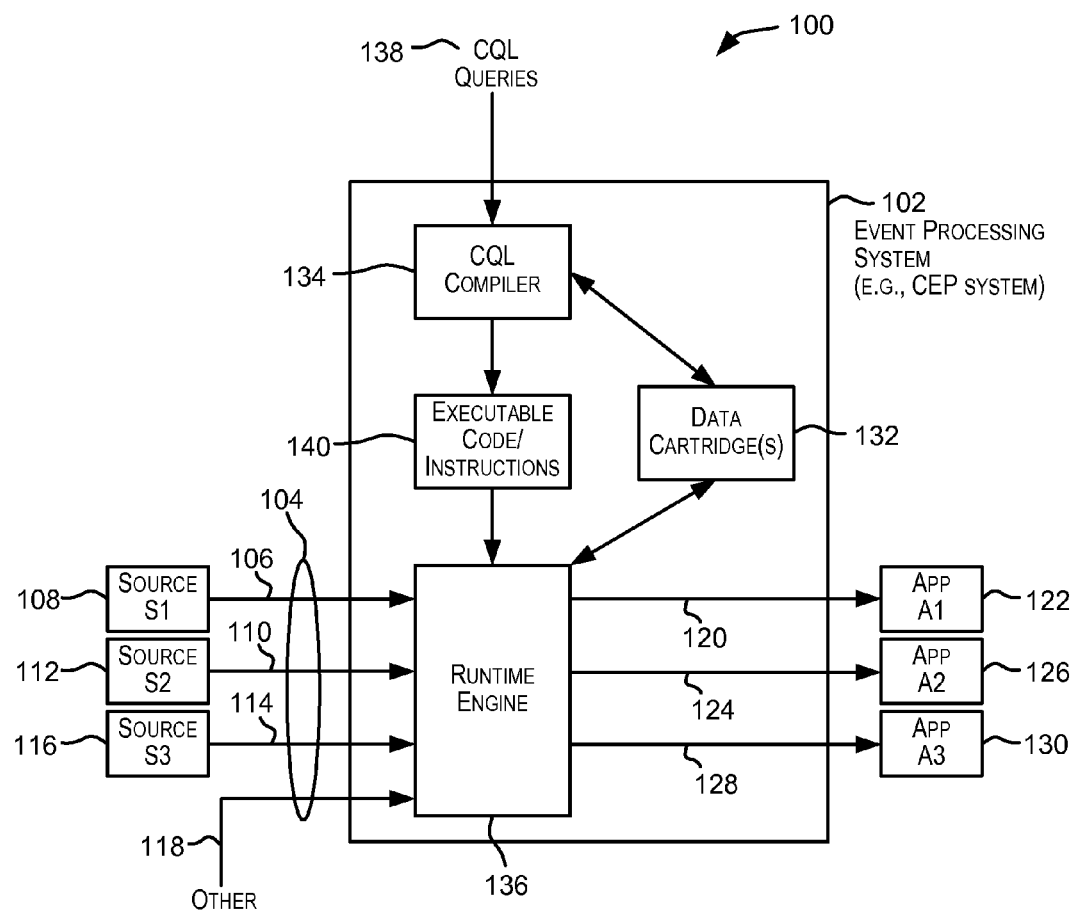
FIG. 1 is a simplified block diagram of an event processing system in accordance with an embodiment of the present invention.

FIG. 1 is a simplified block diagram of a system 100 according to an embodiment of the present invention. As shown, system 100 includes an event processing system 102 that is configured to process event streams. Event processing system 102 can be a CEP system such as the one provided by Oracle Corporation™. Other event processing systems provided by other vendors can be used in alternative embodiments. The embodiment depicted in FIG. 1 is not intended to limit the scope of embodiments of the invention. Variations having more or less components than shown in FIG. 1 are possible in alternative embodiments.

Event processing system 102 can receive one or more inputs 104. Inputs 104 can include one or more event streams received from one or more sources. For example, as depicted in FIG. 1, event processing system 102 can receive an event stream 106 from a source S1 108, an event stream 110 from a source S2 112, and another event stream 114 from a source S3 116. The sources can be diverse; for example, source S1 can be an RFID sensor providing a stream of sensor readings, source S2 can be a GPS device providing a stream of spatial coordinates, and source S3 can be a financial server providing a stream of stock prices. Accordingly, the type of events received on one stream can be different from events received on another stream. Event processing system 102 can receive the streams via a push-based mechanism, a pull-based mechanism, or other types of mechanisms.

In one set of embodiments, an event stream can be a real-time sequence of events. In a particular embodiment, an event stream can correspond to a sequence of <tuple, timestamp> pairs, with the tuples representing the data portion of the stream. The timestamps associated with the tuples can define a chronological order over the tuples in the stream. In one set of embodiments, the timestamps can be set by an application (e.g., within event processing system 102) configured to receive and/or process the event stream. For example, the receiving application can timestamp each tuple/event upon receipt. In other embodiments, the timestamps can be set by an application configured to send out the event stream. In certain embodiments, multiple tuples can be associated with the same timestamp in a stream. For purposes of the present disclosure, the terms "tuple" and "event" are used interchangeably.

Inputs 104 can also include other inputs 118 such as collections of elements (e.g., a relation). These other inputs 118 can be received from various sources including applications executing on external systems or even on event processing system 102. For example, other inputs 118 can comprise datasets (e.g., relations) configured by applications executing on systems external to event processing system 102 or on event processing system 102. In certain embodiments, the contents of a relation can vary over time. For example, the contents of a relation can change over time by adding one or more elements to the relation, deleting one or more elements from the relation, or updating the relation.

In various embodiments, event processing system 102 can process received inputs 104 and generate one or more outbound event streams as a result of the processing. The processing of inputs 104 can be based upon rules configured for event processing system 102 that determine the runtime behavior of the system. In a particular embodiment, these rules can be expressed as queries using an event processing language. An example of such an event processing language is Continuous Query Language (referred to herein as CQL). Generally speaking, CQL is an event processing language that is based upon SQL, with added constructs that support streaming data. A query written using CQL can be referred to as a CQL query. The queries can be used for processing inputs 104 and generating outbound event streams. Queries typically perform filtering, aggregation, and other functions to discover and extract one or more events from the input streams. The queries thus determine the runtime behavior of event processing system 102. In certain embodiments, the queries can represent the runtime conditions that are to be monitored over the streams.

The queries executed by an event processing system, such as event processing system 102 depicted in FIG. 1, are different from queries that are executed in a typical relational database management system (RDBMS). In an RDBMS, the data is stored in a database and a query is executed over the stored data. The lifetime of the query thus ends upon its execution. In event processing system 102, due to the streaming nature of the inputs, queries can be run over a continuing period of time over time-varying data received over inputs such as input streams. Accordingly, these queries can be referred to as continuous queries.

The outbound streams generated by event processing system 102 from the processing of the input streams can be provided to one or more applications. For example, as depicted in FIG. 1, an outbound stream 120 can be provided to application A1 122, a second outbound stream 124 can be provided to application A2 126, and a third outbound stream 128 can be provided to application A3 130. In certain embodiments, an application receiving an outbound stream can perform further processing on the stream. The applications receiving the outbound stream can be configured to execute on event processing system 102 or another system.

In one set of embodiments, event processing system 102 can natively support a fixed set of data types and operations on those data types (referred to herein as native data types and operations). For purposes of the present disclosure, the terms operation and function are used synonymously. In some situations, these native data types and operations may not sufficient to support the heterogeneous data formats received via the input streams 104 and the functions (e.g., data manipulation functions) related to the data formats. Thus, in certain embodiments, the capabilities of event processing system 102 can be extended through the use of one or more data cartridges 132.

Data cartridges 132 can enable event processing system 102 to support data types, operations, indexing schemes, and other objects not natively supported by the system. For example, in one embodiment data cartridges 132 can include a spatial data cartridge that enables event processing system 102 to process and index spatial data (e.g., geographic or location data). Further, data cartridges 132 can enable event processing system 102 to support various extension languages that are distinct from the native event processing language (e.g., CQL) supported by system 102. For example, in one embodiment data cartridges 132 can include a Java data cartridge that enables event processing system 102 to process queries that reference Java classes, methods, and other programming constructs.

With a framework supporting data cartridges, queries specified for event processing system 102 can not only reference capabilities provided natively by event processing system 102, but can also reference extended capabilities provided by one or more data cartridges 132. In certain embodiments, references to data types and operations that are not supported natively by event processing system 102 can be seamlessly integrated with native data types and operations in the same query. In this manner, data cartridges 132 enable event processing system 102 to be easily extended beyond its native capabilities. As discussed in greater detail below, the processing to support such queries can be automatically taken care of by interactions between event processing system 102 and data cartridges 132.

Figure 2:
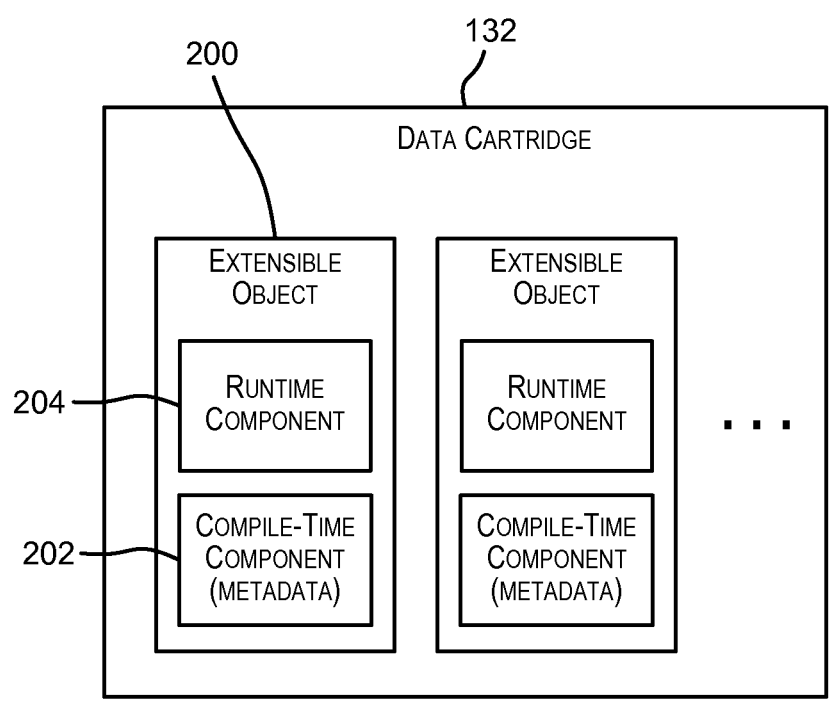
FIG. 2 is a simplified block diagram of a data cartridge in accordance with an embodiment of the present invention.

FIG. 2 is a simplified block diagram of a data cartridge 132 according to an embodiment of the present invention. As shown, data cartridge 132 can store information for one or more extensible objects 200. Examples of such extensible objects include data types, functions, indexes, data sources, and others. In one set of embodiments, the information stored for each extensible object 200 can include at least two components or portions: (1) a compile-time (or metadata) component 202 that describes the extensible object in sufficient detail so that the object can be compiled; and (2) a runtime component 204 that can be invoked at execution time or runtime.

In one set of embodiments, compile-time component 202 can be used for compilation of queries (e.g., CQL queries). The compile-time component of an extensible object can include information (referred to generically as metadata) that describes the extensible object in enough detail so that the compilation of queries referencing the extensible object can perform all the necessary syntactic and semantic analyses and generate execution instructions that are executable at runtime. In some embodiments, extensible objects 200 can be of different types or classes. In these cases, each different object type/class can define a different set of metadata. For example, the metadata for a Java class can include the signatures of the class methods, fields, and constructors.

In various embodiments, all of the metadata provided by data cartridge 132 can be managed by the cartridge itself and not by event processing system 102. This avoids the need to keep data in-sync between data cartridge 132 and event processing system 102 or to pollute event processing system 102 with external data definitions. More details on how these components or portions of a data cartridge are used are provided below.

Referring back to FIG. 1, event processing system 102 can further include a compiler 134 and a runtime engine 136. Compiler 134 can be configured to compile one or more queries 138 (e.g., CQL queries) and generate executable code/instructions 140. In one set of embodiments, compiler 132 can use the compile-time components stored for the various extensible objects in a data cartridge to facilitate the compilation process. Code/instructions 140 generated as a result of the compilation can be executed during runtime to process incoming events. In certain embodiments, code/instructions 140 can comprise call-out instructions to functions that are implemented by runtime component 204 stored in data cartridge 132 for each extensible object. In this manner, a data cartridge can provide both compile-time support and runtime implementations for an extensible object. The outbound data streams generated by the execution of code/instructions 140 can then be forwarded to one or more applications (e.g., 122, 126, 130).

In the embodiment of FIG. 1, compiler 134 and runtime engine 136 are shown as being part of the same event processing system 102. In alternative embodiments, these components can be resident on different systems. For example, in a particular embodiment, compiler 132 can be resident on a first system and runtime engine 136 can be resident on a second system, where both systems have access to the requisite data cartridges.

Several interactions can take place between event processing system 102 and a data cartridge 132 during query compilation and query runtime execution. For example, during the compilation phase, compiler 134 can receive from, and send to, data cartridge 132 information that facilitates compilation of the query and generation of executable code. During the runtime execution phase, execution of the code generated during the compilation phase can cause interactions and exchange of information between runtime engine 136 and data cartridge 132. For example, whenever a callout instruction to a function is encountered in the executable code and the implementation of the function is provided by data cartridge 132, event processing system 102 can interact with the data cartridge.

Figure 3:
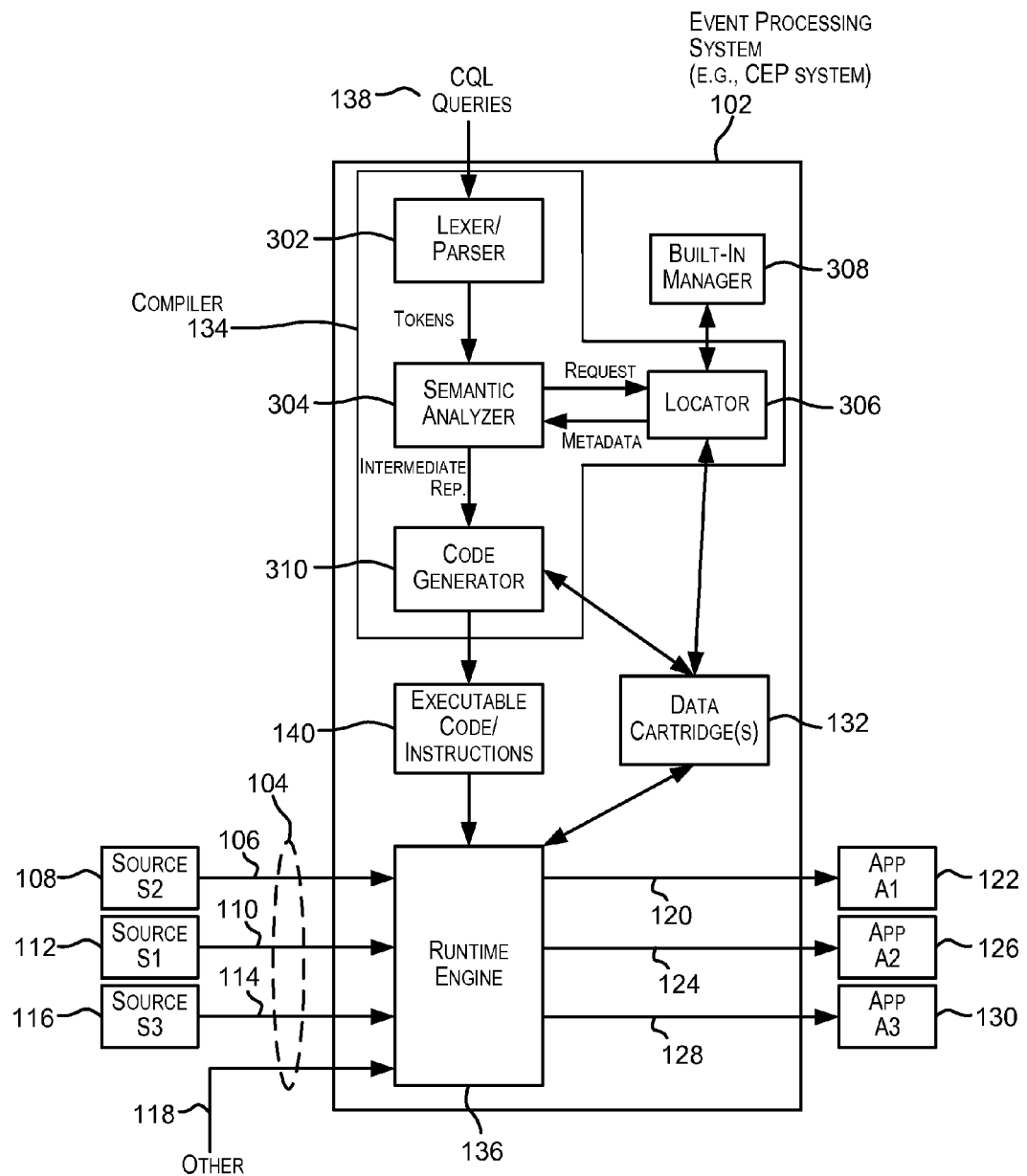
FIG. 3 is another simplified block diagram of an event processing system in accordance with an embodiment of the present invention.

FIG. 3 is another simplified block diagram of event processing system 102 according to an embodiment of the present invention. As in FIG. 1, event processing system 102 includes a compiler 134 and a runtime engine 136. Further, as shown in FIG. 3, compiler 134 can include a lexer/parser 302, a semantic analyzer 304, a locator module 306, and a code generator module 310. The components of compiler 134 can be implemented in software (code or instructions executed by a processor), hardware, or combinations thereof. The software can be stored on a non-transitory computer-readable storage medium. The embodiment of event processing system 102 depicted in FIG. 3 is not intended to limit the scope of embodiments of the invention. Variations having more or less components than shown in FIG. 3 are possible in alternative embodiments.

At a conceptual level, the processing performed by event processing system 102 can be divided into design-time (or compile-time) processing and runtime processing. During design-time processing, compiler 134 can receive one or more continuous queries configured for the event processing system and can compile the queries. This compilation can result in the generation of executable code/instructions 140. One or more queries can be compiled as a set to generate executable code/instructions 140. During runtime processing, runtime engine 136 can execute code/instructions 140 to process the incoming event streams 104.

Accordingly, at design-time, one or more queries (e.g., CQL queries) 138 can be provided as inputs to compiler 134. Parser 302 of compiler 134 can parse the queries based upon a grammar. For example, a CQL query can be parsed according to a CQL grammar. The tokens generated by parser 302 from parsing the query can then be passed to semantic analyzer 304 for further processing.

In one set of embodiments, the association between an extensible object and a repository (e.g., a data cartridge) storing metadata for the object is done though a link name or definition, which is specified in the query using the event processing language. In a particular embodiment, a CQL query programmer can use the following CQL code syntax to define a link definition in a query:

object@source

In this embodiment, the @ symbol signals to the compiler that a link definition is present. The string immediately before the @ symbol refers to an object or component (e.g., an extensible object) that is to be compiled and the string immediately after the @ symbol identifies the source or repository of the metadata to be used for compiling the object. The two strings are tokenized by parser 302 and provided to semantic analyzer 304 for semantic analysis. In this manner, a link definition can be provided at the query language level that enables compiler 134 of event processing system 102 to identify the component to be compiled and the source of the metadata (e.g., a data cartridge) to be used for compiling that query component. In one embodiment, a default data cartridge can be used if no specific data cartridge is identified.

Usage examples include:

(1) foo@java where "foo" identifies an object or component (e.g., an extensible function) that is to be compiled using a "java" data cartridge. The "java" data cartridge stores metadata to be used for compiling the identified "foo" object. The "foo" object can be an extensible object such as an extensible data type, an extensible index, etc.

(2) foo@scala

Here, the component "foo" is to be compiled using a data cartridge named "scala" (different from the "java" data cartridge) that provides the metadata to be used for compiling the "foo" object. Note that the "foo" object is this example is not the same object as in the previous example; they are different objects since they are owned by different cartridges.

(3) CONTAINS@SPATIAL(R1.polygon, R2.point)

Here, "CONTAINS" identifies an extensible function defined within the "SPATIAL" data cartridge. As part of the parsing performed by parser 302, the arguments (if any) defined for a function can be determined and tokenized. In this example, the arguments of function CONTAINS include "R1.polygon" and "R2.point."

In one set of embodiments, before a data cartridge can be used by an event processing system, the data cartridge may be registered with the event processing system. Various data cartridges can be registered with event processing system 102. The registration information stored for a data cartridge can identify the name of the data cartridge, e.g., "scala," "spatial," etc. This registration information can be stored in a registry of event processing system 102 and used during the compilation phase. For example, when a particular data cartridge is identified by a link definition in a query, information for the data cartridge can be searched for and fetched from the registry.

As described above, as part of the compilation process, parser 302 of event processing system 102 can parse CQL query 138 to identify occurrences of link definitions in the query. In one embodiment, the processing can include parsing the CQL query to look for occurrences of the @ symbol, and for each occurrence, determining the object to be compiled, the source of metadata for compiling the object, and arguments, if any, to the object. The tokens generated by parser 302 can then be passed to semantic analyzer 304 for semantic analysis.

Semantic analyzer 304 can perform semantic analysis on the query, such as type checking. In certain embodiments, for a set of tokens received from parser 302, semantic analyzer 304 can invoke a locator 306 to retrieve metadata to be used for performing semantic analysis related to the tokens. For example, based upon the tokens received from parser 302, semantic analyzer 304 can send a request to locator 306 to locate the metadata source or repository (e.g., a data cartridge) identified by a token. In response, locator 306 can provide semantic analyzer 304 a handle to the requested metadata source or repository.

In one set of embodiments, the repository can be a system that is internal to event processing system 102. For example, for natively supported data types and/or operations, the metadata can be provided by a built-in manager 308 of event processing system 102. For extensible objects that are not natively supported by event processing system 102, the repository can be a data cartridge 132 that is registered with event processing system 102.

Semantic analyzer 304 can then access or retrieve the requisite metadata stored by the metadata source using the handle provided by locator 306. Semantic analyzer 304 can use this retrieved information to perform semantic analysis. In one set of embodiments, using the handle, semantic analyzer 304 can interact with the metadata source via well-known interfaces provided by the developer of the repository. For example, if the metadata source is data cartridge 132, the data cartridge can provide well-known interfaces created by the data cartridge developer to enable semantic analyzer 304 to interact with the data cartridge. These well-known interfaces can be developed by the data cartridge developer according to predetermined interface standards that allow data cartridge 132 to be compatible with a data cartridge infrastructure provided by event processing system 102.

From the perspective of semantic analyzer 304, it does not matter whether the handle returned by locator 306 is a handle to a data cartridge or some other source; both handles are treated and interacted with in a similar manner. Locator 306 thus provides the interface between compiler 134 and the source of the metadata that enables the source of the metadata to be decoupled from compiler 134. This enables the metadata to be provided from any source, including a source within event processing system 102 or a data cartridge 132. Additionally, the source of the metadata can be distributed, for example, made available in a cloud, etc.

For instance, in examples (1), (2), and (3) shown above, semantic analyzer 304 can request locator 306 to get handles to data cartridges "java," "scala," and "SPATIAL." These data cartridges can be pre-registered with event processing system 102 and information related to the registered data cartridges, including the names of the data cartridges and handles to the data cartridges, can be stored in a registry. Locator 306 can perform a lookup in this registry to get a handle to the requested data cartridge and provide the handle to semantic analyzer 304.

Upon receiving a handle to a metadata source such as data cartridge 132, semantic analyzer 304 can interact with the data cartridge using published interfaces. For example, semantic analyzer 304 can use the interfaces to retrieve metadata from the data cartridge and use the retrieved metadata to perform semantic analysis of the query, including performing type checking for extensible objects included in the query. The result of the semantic analysis performed by semantic analyzer 304 is an intermediate representation that can be provided to code generator 310 for further analysis/processing.

In one set of embodiments, for a particular extensible object, the metadata provided to semantic analyzer 304 by data cartridge 132 for compilation of the extensible object can include information identifying one or more factories to be used for creating one or more instances of the extensible object. The metadata provided to compiler 134 can also include application context information that is used during runtime processing. For example, when performing spatial data analysis, a specific coordinate system usually needs to be specified for performing the analysis. Different spatial data applications can use different coordinate systems. The application context information can be used to specify the coordinate system to be used during runtime for an application. This context information can be provided by data cartridge 132 to semantic analyzer 304 (or in general to compiler 134). In this manner, data cartridge 132 can provide information to event processing system 102 during the compilation phase that is to be used during the runtime phase. In certain embodiments, this application context information can be configured by a developer of the data cartridge. Thus, the data cartridge developer can set parameters to be used for runtime processing.

Code generator 310 can generate an execution plan for the query being compiled and can generate execution structures (e.g., executable code/instructions 140) based upon the execution plan. The execution structures that are generated can include instances of extensible objects referenced in the query. The extensible object instances can be created using one or more factories identified in the metadata retrieved from the data cartridge during compilation.

Executable instructions 140 generated by compiler 134 can then be executed at runtime by runtime engine 136 with respect to events received via an input stream 104. The instructions can comprise one or more call-out instructions to functions whose implementations are provided by the runtime component stored by the data cartridge for the extensible object. A call-out instruction executes an invocable component that is part of the runtime component stored by the data cartridge for the extensible object. In one embodiment, a call-out invokes an "execute" call-back (i.e., function), whose implementation is provided by the data cartridge. This "function" in the data cartridge can be implemented using different programming languages, such as a Java type, a Hadoop function, a Scala class, etc. The call-out instruction thus provides a handoff between runtime engine 136 and data cartridge 132.

In the examples discussed above, the queries are expressed in CQL. Accordingly, compiler 134 and runtime engine 136 can be together referred to as the CQL engine of event processing system 102. In alternative embodiments, other languages that provide features for stream-based processing can also be used for configuring queries executed by event processing system 102.

Figure 4:
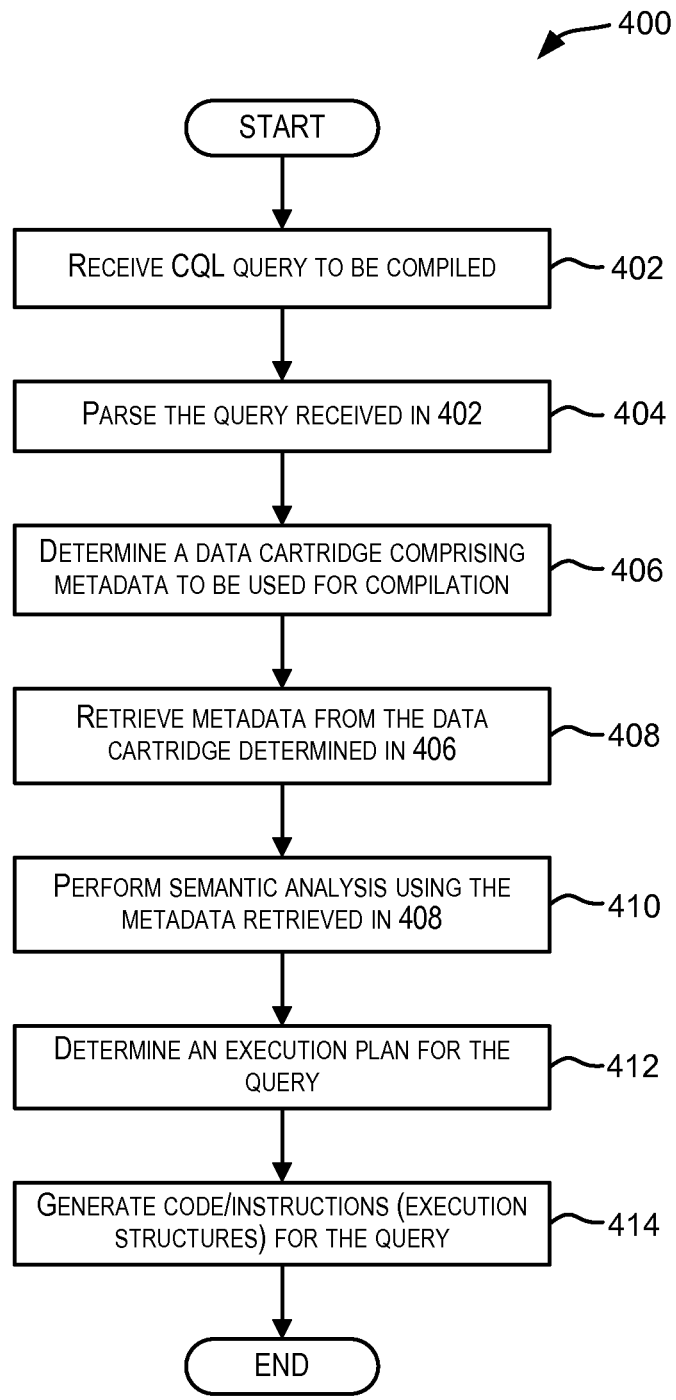
FIG. 4 is a flow diagram of a process performed by an event processing system for compiling a query using a data cartridge in accordance with an embodiment of the present invention.

FIG. 4 is a flow diagram of a process 400 for compiling a query in an event processing system using a data cartridge according to an embodiment of the present invention. In various embodiments, process 400 can be implemented in software (e.g., program code/instructions executed by a processor), hardware, or combinations thereof. The software can be stored on a non-transitory computer-readable storage medium. In a particular embodiment, process 400 can be performed by compiler 134 of FIGS. 1 and 3.

As shown, processing can be initiated upon receiving a query to be compiled (block 402). In some embodiments, multiple queries can be received and compiled together as a set. However, for the sake of simplicity, it is assumed that one query is received in process 400. The query received in 402 can be, for example, a continuous query (e.g., a CQL query) that is configured to process events received via one or more event streams. The query can be received from various sources, such as sources 108, 112, 116, 118 of FIG. 1.

At block 404, the query can be parsed by a compiler 134 into a set of tokens. As part of this step, compiler 134 can identify (via, e.g., parser 302) one or more link definitions included in the query. These link definitions can identify extensible objects used in the query, as well as their corresponding data cartridges. Compiler 132 can then determine the data cartridges needed for compiling the query based upon the link definitions (block 406).

At block 408, compiler 134 can retrieve metadata from the data cartridge(s) determined at block 406. In one set of embodiments, compiler 134 can first obtain (via, e.g., locator 306) a handle to each data cartridge. Using the handle, compiler can access metadata from the data cartridge via one or more well-known interfaces provided by the data cartridge.

At block 410, compiler can perform (via, e.g., semantic analyzer 304) various types of semantic analysis on the parsed query using the metadata retrieved at block 408. Such analysis can include, for example, type checking.

An execution plan can then be determined for the query, and code/instructions can be generated based upon the execution plan (blocks 412, 414). In one set of embodiments, the processing performed at block 414 can include instantiating execution structures for the query. The code/instructions generated at block 414 (including the execution structures) can be stored on a non-transitory computer-readable storage medium. In a particular embodiment, the execution structures can be generated using one or more factories identified by the metadata retrieved at block 408. The code/instructions can then be executed during runtime for processing event streams received by event processing system 102.

Although not shown in FIG. 4, in certain embodiments the metadata retrieved from a data cartridge at block 408 can include application context information that is to be used during runtime processing. This application context information can be incorporated into the code/instructions generated in 414.

It should be appreciated that process 400 is illustrative and that variations and modifications are possible. Steps described as sequential can be executed in parallel, order of steps can be varied, and steps can be modified, combined, added, or omitted. One of ordinary skill in the art will recognize many variations, modifications, and alternatives.

Figure 5:
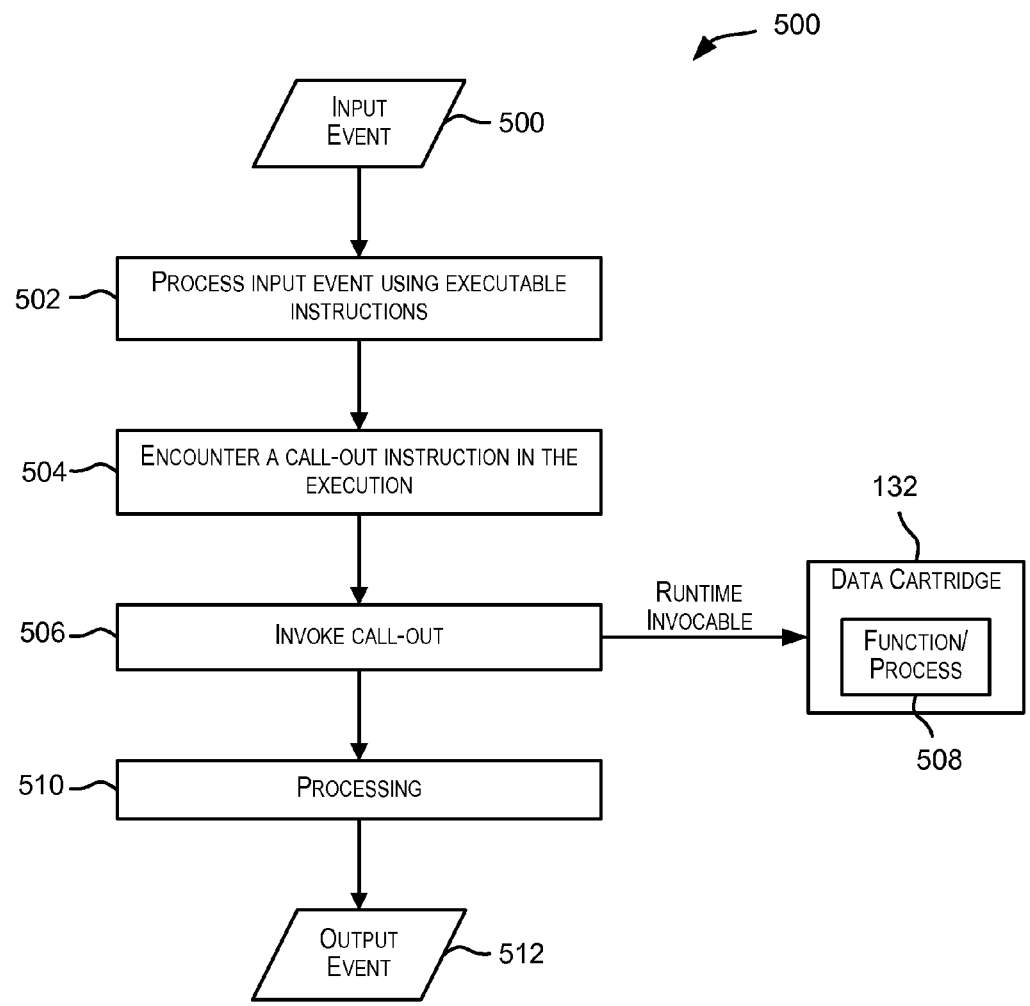
FIG. 5 is a flow diagram of a process performed by an event processing system for executing a query using a data cartridge in accordance with an embodiment of the present invention.

FIG. 5 is a flow diagram of a process 500 performed by an event processing system for executing a query using a data cartridge according to an embodiment of the present invention. In certain embodiments, process 500 can correspond to the runtime processing performed by event processing system 102 for executing the query compiled in FIG. 4. In a particular embodiment, process 500 can be performed by runtime engine 136 of system 102.

At block 502, runtime engine 136 can receive an input event 500 via an input stream (e.g., 108, 112, 116, 118) received by event processing system 102. Runtime engine 136 can then process input event 500 with respect to a query by executing the code/instructions generated for the query at block 414 of FIG. 4.

During execution of the code/instructions, runtime engine 136 can encounter a call-out instruction to a function whose implementation (e.g., 508) is provided by a data cartridge (e.g., 132). In response, runtime engine 136 can invoke the call-out instruction, which causes function implementation 508 within data cartridge 132 to be executed (block 506). Implementation 508 can process input event 508, and can return the results of the processing to runtime engine 136. An output event 512 can then be generated based upon the processing (block 510). In various embodiments, the output event can be provided to one or more applications via an outbound stream (e.g., 102, 124, 128 of FIG. 1).

Although not shown in FIG. 5, in certain embodiments runtime engine 136 can pass application context information to data cartridge 132 when invoking the call-out instruction at block 506. This application context information can correspond to the context information received from the data cartridge during the compilation process of FIG. 4. Data cartridge can then execute the function implementation based on the application context information. For example, if data cartridge 132 is configured to provide support for spatial data types, and if the function invoked at block 506 is a spatial function (e.g., CONTAINS), runtime engine 136 may pass application context information including a spatial coordinate system to data cartridge 132. Data cartridge 132 can then execute the CONTAINS function on input event 500 with respect to the coordinate system specified in the application context information.

It should be appreciated that process 500 is illustrative and that variations and modifications are possible. Steps described as sequential can be executed in parallel, order of steps can be varied, and steps can be modified, combined, added, or omitted. One of ordinary skill in the art will recognize many variations, modifications, and alternatives.

As discussed above, embodiments of the present invention provide an infrastructure for extending the native capabilities of an event processing system via data cartridges. In one set of embodiments, the event processing system can interact with a data cartridge at query compilation time to retrieve metadata regarding extensible objects and to generate executable code/instructions for the query. Since the metadata for extensible objects is entirely contained within the data cartridge, the event processing system does not need to store any information pertaining to the objects.

In a further set of embodiments, the event processing system can interact with the data cartridge at runtime to facilitate execution of the query. For example, when a call-out instruction to a data cartridge function is encountered during execution of the query, the system can hand over processing to the data cartridge, which can execute the function as implemented within the cartridge. In various embodiments, the call-out instruction can refer to a function related to an extensible object provided by the data cartridge. Since the implementation of the function is entirely contained within the data cartridge, the event processing system does not need to maintain any implementations or other code for extensible objects.

Thus, the data cartridge framework of the present invention can provide a modular and flexible mechanism for extending the native capabilities of an event processing system. In particular, each data cartridge can be a self-contained, modular unit configured to store all of the compile-time metadata and runtime code need to support extensible objects. These data cartridges can then be dynamically registered/enabled on a particular system on an as-needed basis to provide the additional features supported by the data cartridges. Since all data pertaining to extensible objects is maintained by the data cartridge, the event processing system does not need to be modified or customized for each desired feature.

Support for Extension Languages

Generally speaking, an event processing system is configured to process queries that are expressed in the event processing language natively supported by the system (e.g., CQL). In certain embodiments, the data cartridge framework described herein can extend the capabilities of an event processing system to process queries that include references to data types or other objects expressed/implemented in another language (referred to herein as an extension language) different from the system's native event processing language. For example, a Java data cartridge can be provided that enables an event processing system to compile and execute CQL queries that reference Java classes, methods, and other programming constructs. Other types of data cartridges for supporting various other extension languages can also be provided. In these embodiments, an event processing system can interact with an extension language data cartridge to compile and execute queries that are written using a combination of the system's native event processing language and the extension language.

By way of illustration, consider an event processing application that is attempting to correlate the sales of certain items to regional event news. For example, the result of a sport event may influence the sales of the winning team's merchandise, or prolonged bad weather may increase the sales of weather-related items, such as umbrellas and raincoats. The goal of the event processing application is to determine which news events generate more sales, and which ones do not. Or, from another perspective, to quantify how much of a situation is needed to change the local spending behavior.

In this particular scenario, two event streams can be provided as inputs to an event processing system configured to interoperate with the application—a news stream and a sales stream. Assume that the news stream is unstructured in nature and is thus defined by a single message property of type String. Further, assume that the following event type defines the sales stream:

---
item_description: String
category: String
location: String
price: floating number
---

Assume that the location property in the sales stream specifies the city and state (comma separated) where an item is sold. The following is an instance of an event conforming to this type:

---
{item_description: "raincoat", category: "cloth", location: "San Francisco, CA", price: 10.5}
---

As mentioned above, the goal of the event processing application is to correlate a news event to a sales event. To achieve this, the first step is to define a window of interest on the news and sales streams. The follow CQL query fragment defines a window of one day:

---
SELECT * FROM
news [RANGE 24 HOURS],
sales [RANGE 24 HOURS]
WHERE...
---

The second step is to define how the events in the news and sales streams are correlated. Note that, in this scenario, the news event does not have a location property that can be used for joining to the location property of the sales event. One solution to this is to search for a String in the news message that represents the two-letter acronym of a state, and to use that sub-string as a join criterion. For our search, we are only interested in whole words that are uppercase. For example, "CA" should match, whereas "caveat" or "CATEGORY" should not.

Such a String search can be easily accomplished with regular expressions, which are a common feature of many programming languages. For instance, the following code fragment executes our desired String search using the Java programming language:

```
Matcher matcher = Pattern. Compile("[.,;][A-Z][A-Z][.,;]").matcher(message);
If (matcher.find( )) {
    System.out.println("Location = " +
    message.substring(matcher.start( ) + 1, matcher.end( ) – 1));
}
```

However, this String search cannot be easily accomplished in existing event processing languages such as CQL. The grammars of event processing languages generally focus on event processing-related verbs and subjects, such as the definition of a streaming window, and thus are not designed to facilitate general-purpose code such as string manipulation/matching, date formatting, and the like.

To address this shortcoming, certain embodiments of the present invention enable queries/statements expressed in an event processing language (e.g., CQL) to incorporate references to constructs/objects expressed in another (extension) language (e.g., Java). For instance, the following "hybrid" CQL statements incorporate portions of Java code to implement our desired processing on the news and event streams:

```
CREATE VIEW filtered_news(message, matcher) AS
SELECT message, Pattern.compile("[.,;][A-Z][A-Z][.,;]").matcher(message)
FROM news [RANGE 24 HOURS]
SELECT location, item_description, message
FROM filtered_news, sales[RANGE 24 HOURS]
WHERE matcher.find( ) = true AND
News.message.substring(matcher.start( ) +1, matcher.end( ) –1) =
sales.location
```

As shown, a filtered_news view is created via a CQL CREATE VIEW statement that includes a Java expression in its SELECT clause ("Pattern.compile("[.,;][A-Z][A-Z][.,;]").matcher(message)"). The Java expression includes an invocation of the static method compile(String) from the Java class java.util.regex.Pattern, and a subsequent invocation of the method matcher(String) on the Pattern object returned from the compile( ) method. The return object from the method matcher( ) is stored as the attribute "matcher" of the filtered_news view.

A query is then executed on the sales stream and the filtered_news view via a CQL SELECT statement. The WHERE clause invokes several methods from the Java class Matcher, such as find( ), start( ), and end( ). The WHERE clause also invokes the Java String.substring( ) method. The result from the substring( ) method is used to join with the location property of the sales event.

By integrating aspects of an extension language and an event processing language in a hybrid query as described above, embodiments of the present invention can leverage various features of the extension language (e.g., pre-existing libraries, etc.) in an event processing context.

To enable compilation and execution of these hybrid queries, embodiments of the present invention can provide one or more extension language data cartridges. Each extension language data cartridge can be similar in structure to data cartridge 132 shown in FIG. 2, and can include compile-time information (e.g., metadata) and runtime information for objects (e.g., data types, methods, etc.) supported by an extension language. At query compilation time, an event processing system can parse an input query expressed in the system's native event processing language and can identify constructs/expressions in the query expressed in an extension language. Examples of such constructs/expressions can include complex data types, or invocations of language-specific methods/operations. The event processing system can then interact with a data cartridge defined for the extension language to retrieve metadata regarding the extension language constructs and to generate executable code/instructions for the query. At runtime, the event processing system can invoke the executable code/instructions to execute the query.

Since the semantics and implementation details of an extension language are encapsulated in its corresponding data cartridge, the event processing system does not need to be modified or customized to support the language. Further, this solution allows different extension language bindings to co-exist. In one set of embodiments, extension language data cartridges can be provided for supporting complex data types and associated methods/operations that are common in object-oriented languages, such as Java, C++, Scala, and the like. In further embodiments, other types of extension language data cartridges for supporting other types of languages can be provided.

Figure 6:
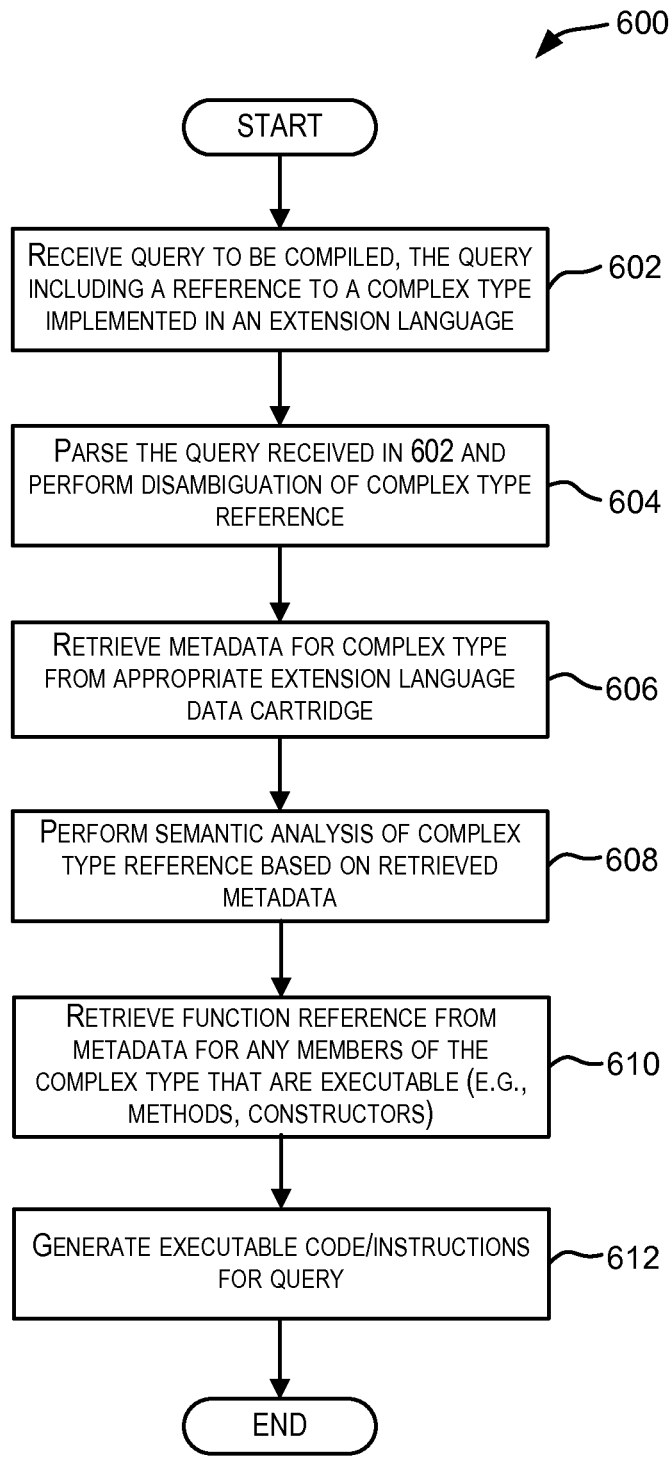
FIG. 6 is a flow diagram of a process performed by an event processing system for compiling a query using an extension language data cartridge in accordance with an embodiment of the present invention.

FIG. 6 is a flow diagram of a process 600 for compiling a query in an event processing system using an extension language data cartridge according to an embodiment of the present invention. In various embodiments, process 600 can be implemented in software (e.g., program code/instructions executed by a processor), hardware, or combinations thereof. The software can be stored on a non-transitory computer-readable storage medium. In a particular embodiment, process 600 can be performed by compiler 134 of event processing system 102 (shown in FIGS. 1 and 3).

At block 602, a query to be compiled can be received. In various embodiments, the query can be a continuous query that is expressed in an event processing language (e.g., CQL) and is configured to process events received via one or more event streams. The query can be received from various sources, such as sources 108, 112, 116, 118 of FIG. 1.

In one set of embodiments, the query can include a reference to a complex type that is expressed/implemented in an extension language distinct from the event processing language. In a particular embodiment, the event processing language can be CQL and the extension language can be an object-oriented language such as Java. For example, the query can correspond to the CQL CREATE VIEW statement described above that includes the Java expression "Pattern.compile("[.,;][A-Z][A-Z][.,;]").matcher(message)" in its SELECT clause.

As used herein, a complex type is a data type that defines static or instance member fields, static or instance member methods, and constructors. One example of a complex data type is a Java class. The type of the field, and the return type and parameter type of the methods can be a simple type or also a complex type. Generally speaking, a complex type is identified by a qualified name (set of identifiers separated by a period) in conjunction with its type locator. The last identifier of a qualified name is called its local name; the remaining identifiers define the type's package. A complex type can be defined by a single identifier, in which case the type is unqualified by a package (that is, it has no package name).

At block 604, compiler 134 can parse (via, e.g., parser 302) the query received at block 602 into a set of tokens. As part of this step, compiler 134 can perform a disambiguation analysis to determine how to interpret the reference to the complex type. For example, consider the Java expression "Pattern.compile(<String>)" that references the complex type "Pattern." Since "Pattern" can syntactically refer to multiple different entities, compiler 134 can check the identifier "Pattern" against various sources according to a predefined order of precedence.

In one set of embodiments compiler 134 can check if "Pattern" corresponds to an attribute in any of the event streams referenced by the query. If this check succeeds, compiler 134 can determine that "Pattern" refers to the identified stream attribute. If this check fails, compiler 134 can check if "Pattern" corresponds to a data type defined in the native event processing language of the system (e.g., CQL). If this check succeeds, compiler 134 can determine that "Pattern" refers to the identified native data type. If this check also fails, compiler 134 can check if "Pattern" corresponds to a data type defined in any of the extension languages plugged-in (via data cartridges) to the system. If this check succeeds, compiler 134 can obtain a handle to the appropriate extension language data cartridge and retrieve the metadata for the type from the data cartridge (block 606). If this check fails, compiler 134 can determine that "Pattern" is an unknown or syntactically incorrect identifier, and can raise an error.

In the CQL CREATE VIEW statement above, the identifier "Pattern" is not a stream attribute or a native CQL data type. However, it is a valid Java class. Accordingly, compiler 134 can obtain a handle to a Java data cartridge plugged into the system and retrieve the metadata for the "Pattern" class from the cartridge.

In one set of embodiments, this disambiguation analysis does not need to be performed if the complex type reference is expressed in the form of a link definition, since the link definition will include the name of the appropriate data cartridge (e.g., 'Pattern.compile@Java( . . . )"). In a particular embodiment, compiler 134 can access the Java data cartridge by default when locating an extensible/complex type if no link name is provided.

As noted above, at block 606 compiler 134 can retrieve metadata for the complex type from the extension language data cartridge determined at block 604. In one set of embodiments, the data cartridge can store the following metadata for the various member elements of a complex type:

Field: type, executable implementation class for getter, executable implementation class for setter
Method: return type, parameter types, executable implementation class for method invocation
Constructor: parameter types, executable implementation class for instantiation.

At block 608, compiler 134 can perform (via, e.g., semantic analyzer 304) semantic analysis on the query (and, in particular, on the complex type reference) using the metadata retrieved at block 606. For example, compiler 134 can determine whether that the expression "Pattern.compile(<String>)" is valid by checking whether the metadata for the "Pattern" class includes a method signature where the method name is "compile" and the parameter list includes a parameter of type String. If such a method signature is found, the expression is deemed to be semantically correct. As another example, if the complex type reference is a constructor invocation (e.g., "foo( )"), compiler 134 can determine whether "foo( )" is valid by checking whether the metadata for the "foo" class includes a constructor whose name is "foo" and does not take any parameters.

In one set of embodiments, the process of validating the complex type reference can include a step of mapping one or more native types supported in the event processing language to corresponding data types supported in the extension language. For example, the method invocation "Pattern.compile( . . . )" takes as a parameter a sequences of characters (e.g., a string) such as "San Francisco, Calif." When this expression is parsed by compiler 134, the portion "San Francisco. Calif." will initially be interpreted as being of type "Char" (which is the native string type of CQL). The Char data type can then be mapped to the corresponding string class in Java (e.g., java.lang.String) in order to validate the expression against the method signature stored in the Java data cartridge for method compile( ) (which is specified as taking an argument of java.lang.String). By performing this type mapping, compiler 134 does not need to natively support all of the data types defined in a particular extension language; rather, the compiler need only know how to convert between the native types and extension language types. Further, this mapping process enables compiler 134 to distinguish between methods that share the same name but different parameter types (e.g., method overloading).

The following table lists an example set of mappings from CQL native types to Java types/classes:

TABLE 1

| CQL native type to Java class mappings | |
|---|---|
| Source: CQL native type | Target: Java class |
| Int | Primitive int |
| BigInt | Primitive long |
| Float | Primitive float |
| Double | Primitive double |
| Byte | byte[ ] |
| Char | java.lang.String |
| Boolean | Primitive boolean |
| Interval | Primitive long |
| XMLTYPE | java.lang.String |

In one set of embodiments, the mappings from CQL native types to Java types/classes as shown above may not be symmetrical in the reverse direction. Accordingly, the following table lists an example set of mappings from Java types/classes to CQL native types:

TABLE 2

| Java class to CQL native type mappings | |
|---|---|
| Source: Java class | Target: CQL native types |
| Primitive int | Int |
| Primitive long | BigInt |
| Primitive float | Float |
| Primitive double | Double |
| byte[ ] | Byte[ ] |
| java.lang.String | Char |
| Primitive boolean | Boolean |
| java.sql.Date, java.sql.Timestamp | Interval |
| java.SQL | XMLTYPE |

Once the complex type reference has been semantically analyzed, compiler 134 can retrieve a function reference from the complex type's metadata for any of its members that are executable (block 610). Thus, returning to the example above, compiler 134 can retrieve a function reference from the metadata for the Pattern class that represents the execution of the method compile( ). In certain embodiments, this process is similar to retrieving a call-out instruction to a function implementation as described with respect to block 414 of FIG. 4. This function reference can then incorporated into executable code/instructions that are generated for the query (block 612).

In certain embodiments, the metadata retrieved for the complex type at block 606 can include member definitions/implementations inherited from one or more superclasses. If the metadata includes multiple method implementations sharing the same signature (e.g., one implemented in the instance class, one implemented in a superclass), compiler 134 can retrieve a function reference to the "lowest level" implementation in the class hierarchy. Thus, method overriding can be supported in this manner.

It should be appreciated that process 600 is illustrative and that variations and modifications are possible. Steps described as sequential can be executed in parallel, order of steps can be varied, and steps can be modified, combined, added, or omitted. One of ordinary skill in the art will recognize many variations, modifications, and alternatives.

Once a query that includes extension language constructs (e.g., complex types) is compiled per process 600 of FIG. 6, the executable code/instructions for the query can be executed at runtime to process event streams received by event processing system 102. In various embodiments, this runtime processing can be substantially similar process 500 of FIG. 5. For example, during execution of the executable code/instructions, runtime engine 136 of event processing system 102 can encounter a function reference to a method or constructor implemented in an extension language data cartridge. In response, runtime engine 136 can invoke the function reference, which causes the method/constructor implementation within the data cartridge to be executed. The implementation can process an input event and can return the results of the processing to runtime engine 136. An output event can then be generated based upon the processing and provided to one or more applications via an outbound stream (e.g., 102, 124, 128 of FIG. 1).

Like other types of data cartridges, in certain embodiments extension language data cartridges can maintain application context information that can be used at query runtime. For example, an extension language data cartridge can execute a method/constructor implementation based on the application context information. In the case of Java data cartridges, some types of Java data cartridges may include application context information and other types of Java data cartridges may not. For the former type, the Java data cartridge should be registered with the event processing system in order for its associated context information to be accessible at query runtime. For the latter type, the Java classes included in the data cartridge can be exported in the event processing system without registering the cartridge. In one set of embodiments, these exported Java classes can be recognized (and thus usable in queries) via a default Java data cartridge that is plugged-in to the system.

As discussed above, certain embodiments of the present invention can extend the capabilities of an event processing system to support extension languages via data cartridges. In particular, queries/statements expressed in a native event processing language (e.g., CQL) can be modified to incorporate references to constructs/objects expressed in another language (e.g., Java). These hybrid queries/statements can then be processed by the event processing system by interacting with one or more extension language data cartridges that are plugged-in to the system. With this framework, the event processing system need not know any of the implementation details of the extension languages. Rather, the system need only know (via the data cartridges) about the metadata of the extension language types (e.g., complex types), and how to generically invoke functions within the data cartridges.

This framework can yield a number of benefits over prior art approaches for extending the capabilities of an event processing system. First, there is no need to wrap references to extension language constructs in wrapper code such as UDFs. For example, the Java Pattern class can be used/referenced directed in CQL statements. Further, this framework provides a natural blending between the system's native event processing language and the various extension languages. For example, the expression "news.message.substring( )" nests the reference to a Java method (substring( )) of an attribute (message) of a stream (news). Further, this framework allows for any number of extension languages to be supported and co-exist. Since each extension language is implemented in its own data cartridge, they can be plugged-in and out as needed, as well as distributed and reused with other event processing systems. Yet further, types between the native event processing language and the extension languages can be converted seamlessly, thus allowing for overloading, overriding, and casting. In addition, extension language constructs can be used anywhere in the event processing language, including in a WHERE clause (thus participating in a join criterion).

Figure 7:
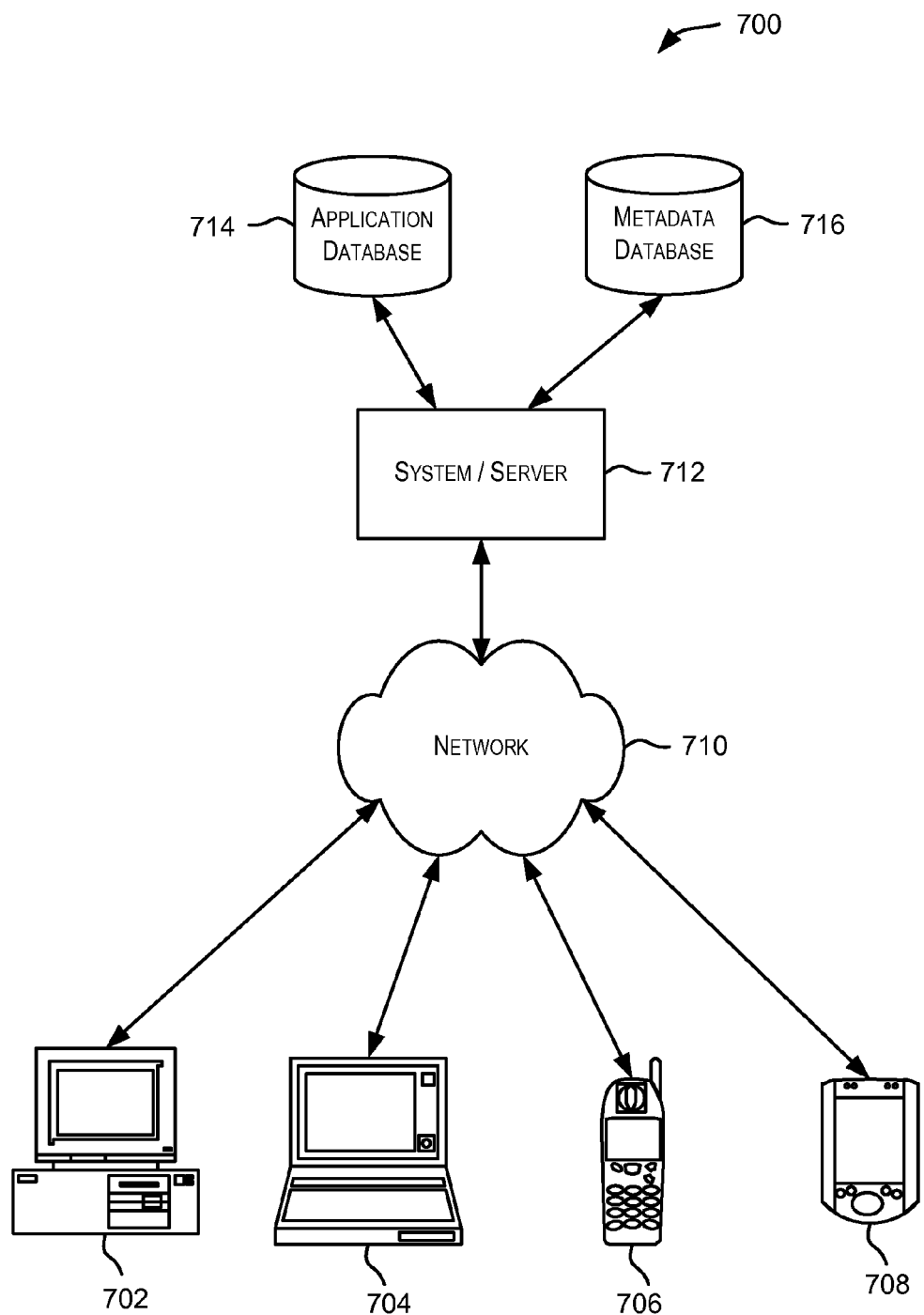
FIG. 7 is a simplified block diagram illustrating components of a system environment that can be used in accordance with an embodiment of the present invention.

FIG. 7 is a simplified block diagram illustrating components of a system environment 700 that can be used in accordance with an embodiment of the present invention. As shown, system environment 700 includes one or more client computing devices 702, 704, 706, 708, which are configured to operate a client application such as a web browser, proprietary client (e.g., Oracle Forms), or the like. In various embodiments, client computing devices 702, 704, 706, and 708 can interact with an event processing system such as system 712.

Client computing devices 702, 704, 706, 708 can be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, and 708 can be any other electronic device, such as a thin-client computer, Internet-enabled gaming system, and/or personal messaging device, capable of communicating over a network (e.g., network 710 described below). Although exemplary system environment 700 is shown with four client computing devices, any number of client computing devices can be supported.

System environment 700 can include a network 710. Network 710 can be any type of network familiar to those skilled in the art that can support data communications using any of a variety of commercially-available protocols, including without limitation TCP/IP, SNA, IPX, AppleTalk, and the like. Merely by way of example, network 710 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Event processing system 712 can comprise one or more server computers which can be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, system 712 can be adapted to run one or more services or software applications described in the foregoing disclosure.

System 712 can run an operating system including any of those discussed above, as well as any commercially available server operating system. System 712 can also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 700 can also include one or more databases 714 and 716. Databases 714 and 716 can reside in a variety of locations. By way of example, one or more of databases 714 and 716 can reside on a storage medium local to (and/or resident in) system 712. Alternatively, databases 714 and 716 can be remote from system 712, and in communication with system 712 via a network-based or dedicated connection. In one set of embodiments, databases 714 and 716 can reside in a storage-area network (SAN) familiar to those skilled in the art. Similarly, any necessary files for performing the functions attributed to system 712 can be stored locally on system 712 and/or remotely, as appropriate. In one set of embodiments, databases 714 and 716 can include relational databases, such as Oracle 10g, which are adapted to store, update, and retrieve data in response to SQL-formatted commands.

Figure 8:
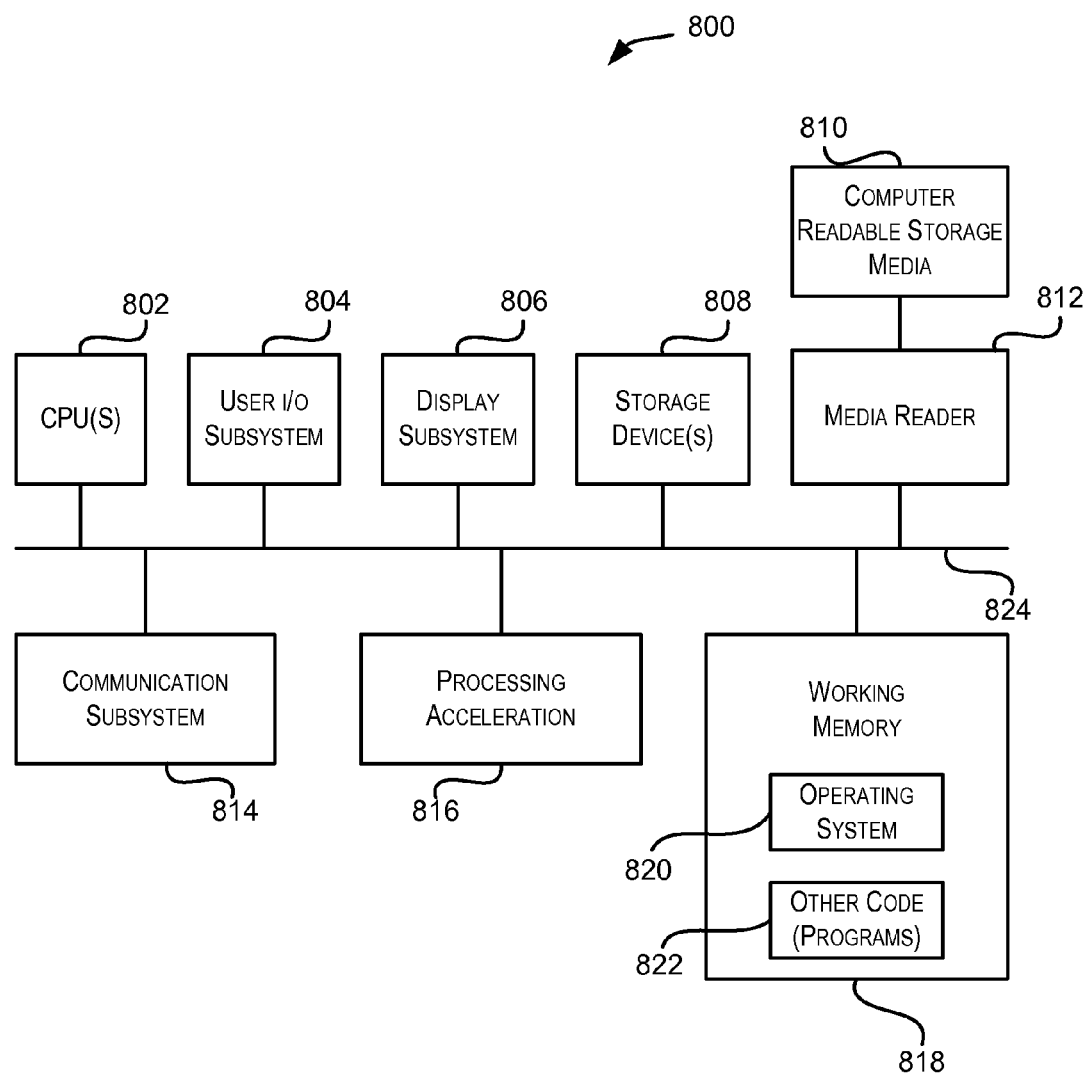
FIG. 8 is a simplified block diagram of a computer system that can be used in accordance with an embodiment of the present invention.

FIG. 8 is a simplified block diagram of a computer system 800 that can be used in accordance with embodiments of the present invention. For example, system 800 can be used to implement event processing system 102 depicted in FIGS. 1 and 3. Computer system 800 is shown comprising hardware elements that can be electrically coupled via a bus 824. The hardware elements can include one or more central processing units (CPUs) 802, one or more input devices 804 (e.g., a mouse, a keyboard, etc.), and one or more output devices 806 (e.g., a display device, a printer, etc.). Computer system 800 can also include one or more storage devices 808. By way of example, the storage device(s) 808 can include devices such as disk drives, optical storage devices, and solid-state storage devices such as a random access memory (RAM) and/or a read-only memory (ROM), which can be programmable, flash-updateable and/or the like.

Computer system 800 can additionally include a computer-readable storage media reader 812, a communications subsystem 814 (e.g., a modem, a network card (wireless or wired), an infra-red communication device, etc.), and working memory 818, which can include RAM and ROM devices as described above. In some embodiments, computer system 800 can also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications subsystem 814 can permit data to be exchanged with network 710 and/or any other computer described above with respect to system environment 700.

Computer system 800 can also comprise software elements, shown as being currently located within working memory 818, including an operating system 820 and/or other code 822, such as an application program (which can be a client application, Web browser, mid-tier application, RDBMS, etc.). In an exemplary embodiment, working memory 818 can include executable code and associated data structures (such as caches) used for processing events and performing data cartridge-related processing as described above. It should be appreciated that alternative embodiments of computer system 800 can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention can be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes can be made thereunto without departing from the broader spirit and scope as set forth in the claims.

What is claimed is:

1. A method comprising:
receiving, by a computer system, a query expressed in an event processing language, the query including a reference to a complex type implemented in another language distinct from the event processing language; and
compiling, by the computer system, the query by:

retrieving metadata pertaining to the complex type from information stored in a data cartridge for the complex type without requiring definition of a function interface for the complex type using data types that are defined in the event processing language; and generating, based on the metadata, executable instructions for executing the query;

wherein the reference to the complex type within the query specifies both (a) a class identifier of a class written in said language distinct from the event processing language and (b) a method identifier of a particular method of the class;

wherein the class written in said language distinct from the event processing language includes a plurality of methods that are invocable as complex types referenced in queries expressed in the event processing language; and wherein the particular method is one of the plurality of methods.

2. The method of claim 1, wherein: the event processing language is Continuous Query Language (CQL).

3. The method of claim 1, wherein: the another language distinct from the event processing language is an object-oriented language.

4. The method of claim 1, wherein: the another language distinct from the event processing language is Java, and wherein the complex type is a Java class.

5. The method of claim 1, wherein: the query is configured for processing one or more events received via one or more event streams.

6. The method of claim 5 wherein retrieving the metadata pertaining to the complex type comprises:
determining whether the complex type corresponds to an attribute in any of the one or more event streams;
if the complex type does not correspond to an attribute in any of the event streams:
determining whether the complex type corresponds to a type defined in the event processing language; and
if the complex type does not correspond to a type defined in the event processing language, retrieving the metadata pertaining to the complex type from the data cartridge.

7. The method of claim 1, wherein:
the reference to the complex type includes an invocation of the particular method associated with the complex type, and
the invocation includes a name of the particular method and one or more parameters.

8. A system comprising:
a processor configured to:
receive a query expressed in an event processing language, the query including a reference to a complex type implemented in another language distinct from the event processing language; and
compile the query by:
retrieving metadata pertaining to the complex type from information stored in a data cartridge for the complex type without requiring definition of a function interface for the complex type using data types that are defined in the event processing language; and
generating, based on the metadata, executable instructions for executing the query;
wherein the reference to the complex type within the query specifies both (a) a class identifier of a class written in said language distinct from the event processing language and (b) a method identifier of a particular method of the class;
wherein the class written in said language distinct from the event processing language includes a plurality of methods that are invocable as complex types referenced in queries expressed in the event processing language; and
wherein the particular method is one of the plurality of methods.

9. The system of claim 8, wherein:
the reference to the complex type includes an invocation of the particular method associated with the complex type, and
the invocation includes a name of the particular method and one or more parameters.

10. A non-transitory computer-readable storage medium having stored thereon instructions executable by a processor, the instructions comprising:
instructions that cause the processor to receive a query expressed in an event processing language, the query including a reference to a complex type implemented in another language distinct from the event processing language; and
instructions that cause the processor to compile the query by:
retrieving metadata pertaining to the complex type from information stored in a data cartridge for the complex type without requiring definition of a function interface for the complex type using data types that are defined in the event processing language; and
generating, based on the metadata, executable instructions for executing the query;
wherein the reference to the complex type within the query specifies both (a) a class identifier of a class written in said language distinct from the event processing language and (b) a method identifier of a particular method of the class;
wherein the class written in said language distinct from the event processing language includes a plurality of methods that are invocable as complex types referenced in queries expressed in the event processing language; and
wherein the particular method is one of the plurality of methods.

11. The non-transitory computer-readable storage medium of claim 10, wherein:
the reference to the complex type includes an invocation of the particular method associated with the complex type, and
the invocation includes a name of the particular method and one or more parameters.

12. The non-transitory computer-readable storage medium of claim 10, wherein: the event processing language is Continuous Query Language (CQL).

13. The non-transitory computer-readable storage medium of claim 10, wherein: the another language distinct from the event processing language is an object-oriented language.

14. The non-transitory computer-readable storage medium of claim 10, wherein: the another language distinct from the event processing language is Java, and wherein the complex type is a Java class.

15. The non-transitory computer-readable storage medium of claim 10, wherein: the query is configured for processing one or more events received via one or more event streams.

16. The non-transitory computer-readable storage medium of claim 15, wherein retrieving the metadata pertaining to the complex type comprises:
determining whether the complex type corresponds to an attribute in any of the one or more event streams;
if the complex type does not correspond to an attribute in any of the event streams:

determining whether the complex type corresponds to a type defined in the event processing language; and if the complex type does not correspond to a type defined in the event processing language, retrieving the metadata pertaining to the complex type from the data cartridge.

* * * * *

UNITED STATES PATENT AND TRADEMARK OFFICE
CERTIFICATE OF CORRECTION

PATENT NO. : 9,058,360 B2  
APPLICATION NO. : 12/957201  
DATED : June 16, 2015  
INVENTOR(S) : de Castro Alves et al.

It is certified that error appears in the above-identified patent and that said Letters Patent is hereby corrected as shown below:

On the title page

On page 5, column 2, item [56] under Other Publications, line 62, before "database" delete "f" and insert -- of --, therefor.

On page 6, column 1, item [56] under Other Publications, line 27, delete "PostgresSQL:" and insert -- PostgreSQL: --, therefor. (First occurrence)

On page 6, column 1, item [56] under Other Publications, line 27, delete "PostgresSQL" and insert -- PostgreSQL --, therefor. (Second occurrence)

On page 6, column 1, item [56] under Other Publications, line 29, delete "PostgresSQL:" and insert -- PostgreSQL: --, therefor. (First occurrence)

On page 6, column 1, item [56] under Other Publications, line 29, delete "PostgresSQL" and insert -- PostgreSQL --, therefor. (Second occurrence)

On page 8, column 2, item [56] under Other Publications, line 28, delete "Integrationand" and insert -- Integration and --, therefor.

In the specification

Column 7, line 31, after "below." delete "the" and insert -- The --, therefor.

Column 17, line 38, delete "Pattern." and insert -- "Pattern. --, therefor.

Column 17, line 48, after "setter" insert -- . --.

Column 17, line 50, after "invocation" insert -- . --.

Signed and Sealed this  
First Day of March, 2016

Michelle K. Lee  
*Director of the United States Patent and Trademark Office*